(12) United States Patent
Mogil

(10) Patent No.: US 7,682,080 B2
(45) Date of Patent: Mar. 23, 2010

(54) FOLDABLE INSULATED BAG

(75) Inventor: Melvin S. Mogil, Toronto (CA)

(73) Assignee: California Innovations Inc., Toronto, Ontario (CA)

( * ) Notice: Subject to any disclaimer, the term of this patent is extended or adjusted under 35 U.S.C. 154(b) by 1251 days.

(21) Appl. No.: 10/340,851

(22) Filed: Jan. 13, 2003

(65) Prior Publication Data
US 2004/0136621 A1 Jul. 15, 2004

(51) Int. Cl.
B65D 30/08 (2006.01)
(52) U.S. Cl. .............................. 383/110; 383/2; 383/6
(58) Field of Classification Search .............. 383/2, 383/6, 21, 22, 24, 25, 107, 109, 110, 113, 383/114, 121, 121.1, 88, 89, 97, 124; 150/107; 190/107; 224/497, 543, 542, 549, 572, 901.4, 224/580, 585
See application file for complete search history.

(56) References Cited

U.S. PATENT DOCUMENTS

| | | | |
|---|---|---|---|
| 1,666,704 A * | 4/1928 | Hunter | 383/2 |
| 1,672,322 A * | 6/1928 | Keiser et al. | 383/119 |
| 1,826,646 A | 10/1931 | Blake | |
| 1,985,111 A | 12/1934 | Shofer et al. | |
| 2,042,288 A | 5/1936 | Bach et al. | |
| 2,457,422 A * | 12/1948 | Warner | 383/2 |
| 3,437,181 A | 4/1969 | Blount Jr. | |
| 3,682,372 A * | 8/1972 | Rodley | 383/104 |
| 3,831,650 A | 8/1974 | Consorti | |
| 4,091,852 A | 5/1978 | Jordan et al. | |
| 4,211,091 A | 7/1980 | Campbell | |
| 4,334,601 A | 6/1982 | Davis | |
| 4,499,999 A | 2/1985 | Behar | |
| 4,509,645 A | 4/1985 | Hotta | |
| 4,679,242 A * | 7/1987 | Brockhaus | 383/4 |
| D291,150 S | 8/1987 | Beran | |
| 4,961,522 A | 10/1990 | Weber | |
| 4,974,966 A | 12/1990 | Fabbi | |
| 4,984,662 A | 1/1991 | Jacober | |
| 5,090,526 A | 2/1992 | Jacober | |
| D328,550 S | 8/1992 | Mogil et al. | |
| 5,158,371 A * | 10/1992 | Moravek | 383/104 |
| 5,353,900 A | 10/1994 | Stilley | |
| 5,472,279 A | 12/1995 | Lin | |
| 5,490,396 A | 2/1996 | Morris | |
| 5,562,228 A | 10/1996 | Ericson | |
| 5,567,055 A | 10/1996 | Smith | |
| D382,771 S | 8/1997 | Mogil | |

(Continued)

FOREIGN PATENT DOCUMENTS

GB 2127678 A * 4/1984

(Continued)

*Primary Examiner*—Robin Hylton
(74) *Attorney, Agent, or Firm*—Arent Fox LLP

(57) ABSTRACT

A soft sided insulated cooler bag has a base and side panels. The base includes a rigid or semi-rigid reinforcement or batten that serve to provide a relatively hard or stiff edge about which the bag can be panel folded over on itself. The upper edge of the bag has a length that is as great as half the periphery of the bottom panel. The bag can be collapsed to a flat position and then panel folded to a storage position. Retainers are provided to keep the bag in the storage position.

2 Claims, 24 Drawing Sheets

U.S. PATENT DOCUMENTS

| | | |
|---|---|---|
| D382,772 S | 8/1997 | Mogil |
| D387,249 S | 12/1997 | Mogil |
| D391,121 S | 2/1998 | Melk |
| 5,857,778 A | 1/1999 | Ells |
| 5,904,230 A | 5/1999 | Peterson |
| 5,957,354 A * | 9/1999 | Mentken ..................... 224/614 |
| 5,964,384 A | 10/1999 | Young |
| 6,068,402 A | 5/2000 | Freese et al. |
| D431,968 S | 10/2000 | Worley et al. |
| D432,870 S | 10/2000 | Worley et al. |
| 6,234,677 B1 | 5/2001 | Mogil |
| 6,247,328 B1 | 6/2001 | Mogil |
| D452,075 S | 12/2001 | Mogil |
| 6,332,712 B1 * | 12/2001 | Headley ..................... 383/64 |
| 6,582,124 B2 | 6/2003 | Mogil |

FOREIGN PATENT DOCUMENTS

| | | | |
|---|---|---|---|
| WO | WO 92/09219 A1 * | 6/1992 | |
| WO | WO 9209219 A1 * | 6/1992 | |

* cited by examiner

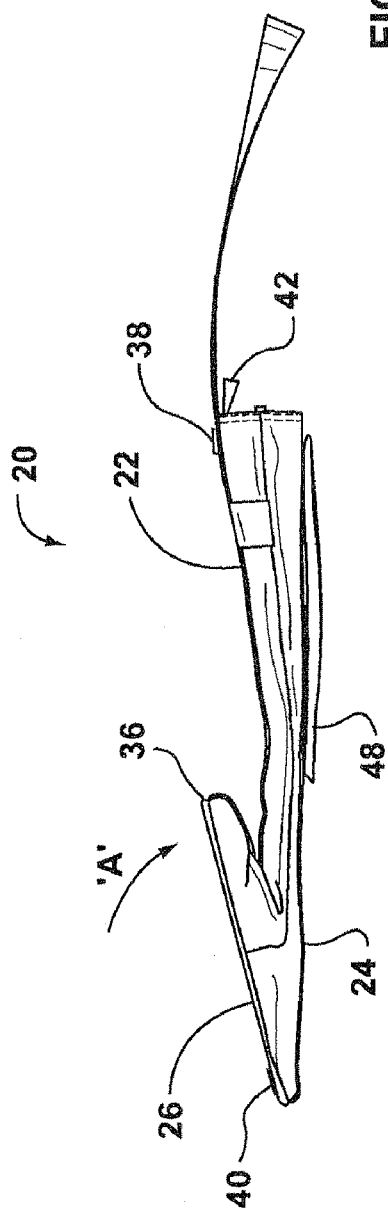
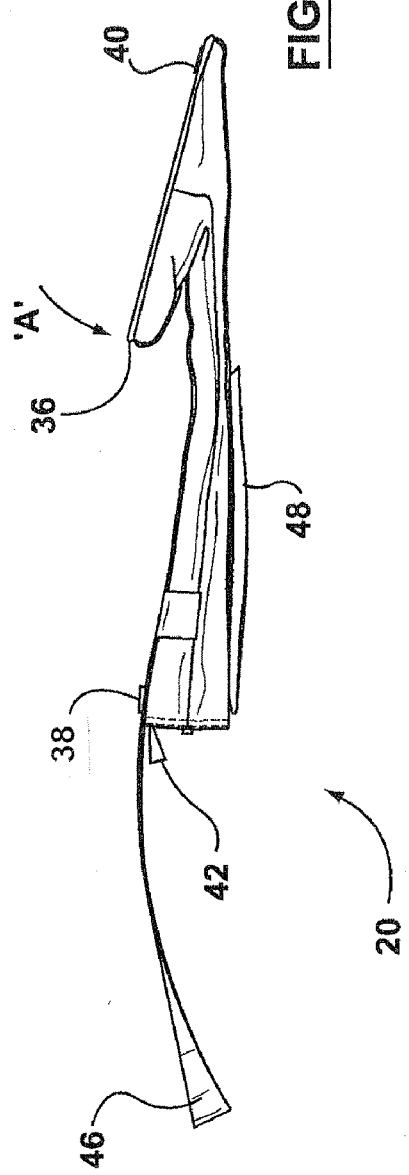
FIG. 6d
FIG. 6c

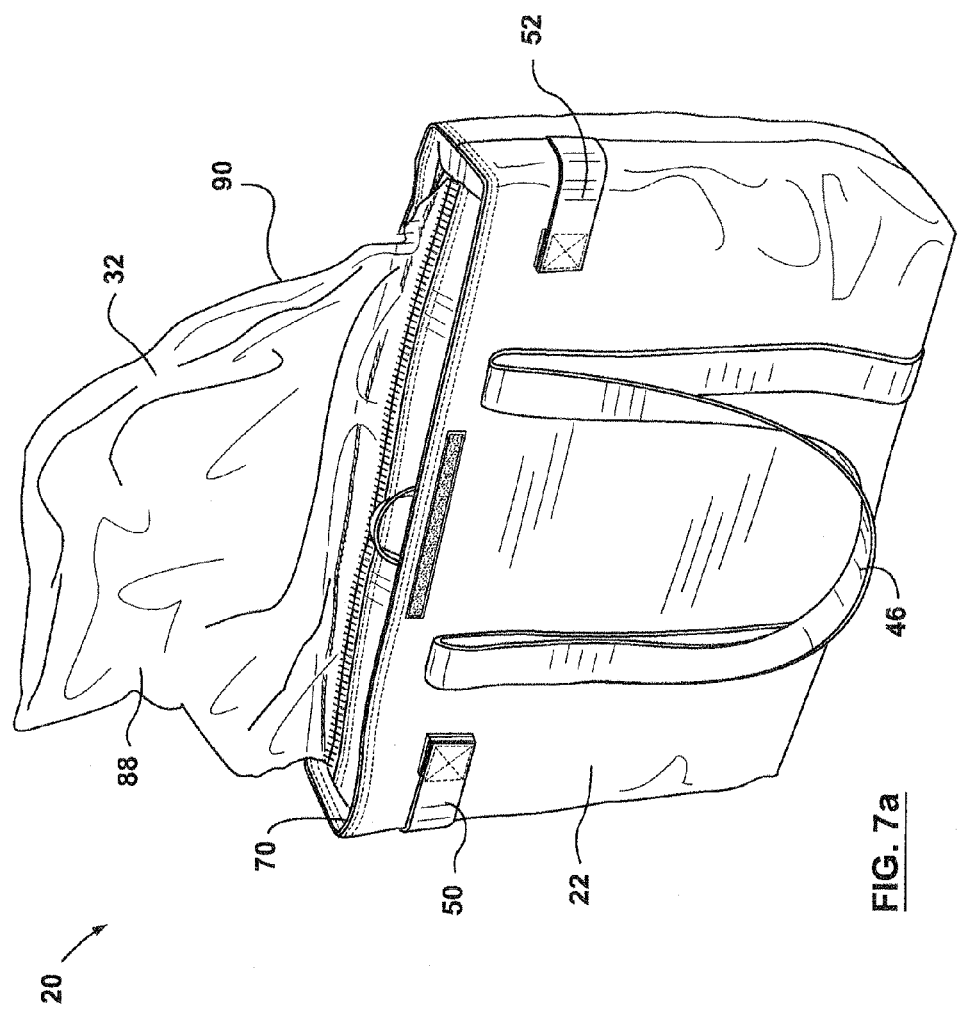

FOLDABLE INSULATED BAG

FIELD OF INVENTION

This invention relates to the field of foldable insulated containers.

BACKGROUND OF THE INVENTION

Collapsible insulated containers have been known for some years. They are typically used as containers for carrying cold drinks, and other cool refreshments, but can also be used to keep foods or beverages warm or hot.

Certain sizes and shapes of coolers are better for some purposes than others. Some collapsible coolers can be folded to a collapsed position, but the folding process may tend to require relatively strong hands, since the insulated panels may be of fair thickness, and may have a resilience that tends to resist folding. These containers tend to unfold easily, but tend to be rather more difficult to fold back into the collapsed or storage position. In the folded position, the front and rear walls remain in generally parallel planar orientation while the bottom panel is folded up in half, and the side panels are folded inward as shown in my issued U.S. Pat. No. Des. 382,771. This kind of cooler is secured in the folded position (a) by a hook-and-eye fabric strip securement between the overfolded lip of the lid portion of the cooler and the front face of the cooler and (b) by side fastening straps that retain the bottom portions of the front panel relative to the back panel, typically by wrapping at least partially around the back panel and being secured thereto with hook-and-eye strips. Coolers of this nature tend to be generally cubic in shape with rectangular sides forming, typically, a six sided box shaped structure when unfolded. A cooler of this type may also tend to require more manufacturing steps than a more bag-like cooler, and may therefore be more costly and time consuming to produce.

Rolling up a collapsible cooler, in the manner in which a sleeping bag is sometimes rolled up, may tend not to be particularly satisfactory in all circumstances. Users may tend to roll up the insulated material too tightly, either damaging the material, or tending to give it a permanent set. This tight rolling approach may also tend to favour persons with relatively strong hands.

It may be that a different kind of cooler is desired that may be somewhat more convenient for rapid use, that may be more quickly and easily folded, or that may provide greater ease of manufacture that may tend to pack efficiently for shipment, or that may present a relatively easily displayed product.

It may also be that it would be preferable to have a cooler that folds in a continuous direction, or that folds back and forth, on a folding panel basis rather than in a continuous tight roll like a sleeping bag.

In the view of the present inventor, there is a need for a foldable insulated container, or bag, that is more easily constructed than the more box shaped type of cubic collapsible insulated container, that may tend to require fewer, or simpler, manufacturing steps, or that may tend to provide an easily displayed and relatively convenient insulated container for everyday use.

SUMMARY OF THE INVENTION

In an aspect of the invention, there is a soft sided insulated cooler container in which one portion page-folds against another along pre-defined panel folds on a discrete number of fold lines.

In an aspect of the invention, there is a foldable insulated bag comprising an insulated wall structure, defining an insulated space therewithin. The wall structure has a closure member operable to govern access to the insulated space. The wall structure includes a forming panel. The wall structure, when empty, is movable to a first, flattened position. The wall structure is foldable over on itself about at least a portion of the forming panel to a folded storage position. The wall structure is securable in the folded storage position.

In an additional feature of that aspect of the invention, the bag is a double fold bag. In another additional feature, the bag includes a retainer. The retainer is operable to secure the bag in the folded storage position. In yet another additional feature, the bag has a bottom region and a top region, and the suspension member is mounted distant from the bottom region.

In still another additional feature, the forming panel includes a stiffener member. In yet still another additional feature, the forming panel has a flexural rigidity greater than any other portion of the bag. In yet another additional feature, the forming panel has an insulating layer and a stiffening layer. In a further additional feature, the forming panel includes a stiffened straight edge. In still a further additional feature, the forming panel includes a pair of spaced apart, parallel stiffened straight edges. In yet a further additional feature, the bag has a base panel and a sidewall structure mounted about the base panel. The forming panel is the base panel.

In still yet a further additional feature, the sidewall structure includes first and second opposed sidewall panels. Each side wall panel has a first edge adjoining the base panel and a second edge distant therefrom. The closure member is mounted to the distant edges.

In another additional feature, the sidewall structure includes first and second opposed sidewall panels. Each side wall panel has a first edge adjoining the base panel and a second edge distant therefrom. The side wall panels have an altitude measured between the first and second edges, and the base panel has a width measured between junctures of the adjoining edges of the sidewall panels therewith. The altitude has a magnitude X, and the width has a magnitude Y wherein X has a value lying on one of the ranges chosen from the set of ranges consisting of (a) 0.8 Y to 1.2 Y; (b) 1.8 Y to 2.2 Y; and (c) 2.8 Y to 3.2 Y.

In still another additional feature, the foldable insulated bag has a retainer operable to secure the foldable insulated bag in the folded storage position. The sidewall structure includes first and second opposed sidewall panels. Each sidewall panel has a first edge adjoining the base panel and a second edge distant therefrom. The base panel has a first edge connected to the first sidewall panel, and a second edge connected to the second sidewall panel. The base panel has an outer face, and an inward face. In the flattened position the first edge of the base panel lies nearer than the second edge of the base panel to the second edge of the first sidewall panel. The outer face of the base panel has a first member of the retainer mounted thereto adjacent to the second edge thereof. The first sidewall panel has a second member of the retainer mounted adjacent to the second edge thereof. The base panel is movable to bring the first portion of the retainer into mating engagement with the second portion of the retainer. In yet another additional feature, the first and second portions of the retainer are mating hook-and-eye fabric strip portions.

In still yet another additional feature, the sidewall structure includes first and second opposed sidewall panels. Each sidewall panel has a first edge adjoining the base panel and a second edge distant therefrom. The base panel has a periphery. The periphery includes a first edge adjoining the first edge of the first sidewall panel, and a second edge adjoining the first edge of the second sidewall panel. The periphery includes two opposed remainder portions between the first and second sides. The portions have lengths $2a_1$ and $2a_2$ respectively. The first edge of the first sidewall panel has a length, L. The first edge of the base panel has a length 'b'. The length L is at least as great as $b+(a_1+a_2)$.

In a further additional feature, the first edge of the first sidewall panel is centered relative to the first edge of the base panel. In yet a further additional feature, the sidewall structure includes first and second opposed sidewall panels. Each sidewall panel has a first edge adjoining the base panel and a second edge distant therefrom. The base panel is rectangular, having two opposed sides of length 'b' and two opposed sides of length 'a'. The first edge of the first sidewall panel has a length, L. The length L is at least as great as b+2a. In still a further additional feature, the first edge of the first sidewall panel is centered relative to the first edge of the base panel.

In still yet a further additional feature, the sidewall structure includes equal sized first and second opposed sidewall panels. Each side wall panel has a first edge adjoining the base panel and a second edge distant therefrom. In another additional feature, the first edges of the first and second sidewall panels have a length $L_1$, and the second edges of the sidewall panels have a length $L_2$, where $L_2$ is at least as great as $L_1$. In still another additional feature, each of the sidewall panels has a second edge distant from the first edge thereof. The second edges of the sidewall panels are each longer than the base panel.

In yet another additional feature, the sidewall structure includes a pair of opposed first and second sidewall panels. The first and second sidewall panels each includes a first edge mounted to the base panel, a second edge opposed to and distant from the second edge, a third edge, and a fourth edge. The fourth edge is opposed to the third edge. The respective third edges are mutually attached. The respective fourth edges are mutually attached. In another additional feature, the insulated bag includes a waterproof liner. In a further additional feature, the insulated bag includes reflective interior surface oriented to face toward objects placed in the insulated space.

In another aspect of the invention, there is a foldable insulated bag comprising a first side panel, a second side panel, and a base panel. At least the first side panel and the second side panel is insulated. At least the first side panel and the second side panel is pliable. The first side panel, the second side panel and the base panel co-operate to define an enclosed, insulated space. The first side panel has a first base edge adjoining the base panel. The second side panel has a second base edge adjoining the base panel. The first side panel has a first distal edge opposite to the first base edge. The second side panel has a second distal edge opposite to the second base edge. At least a portion of the first distal edge is movable relative to at least a portion of the second distal edge to permit access to the enclosed insulated space. A closure member is mounted to govern access to the enclosed, insulated space. The base panel has a length and a width, the length being greater than the width. The distal edge of the first side panel is longer than the base panel.

These and other aspects of the invention may be more readily understood with the aid of the illustrative Figures and detailed description included hereinbelow.

BRIEF DESCRIPTION OF THE DRAWINGS

In the illustrative Figures of an example, or examples, embodying the various aspects of the invention, provided by way of illustration, but not of limitation of the present invention:

FIG. 6b shows a rear view of the bag of FIG. 6a;

FIG. 6c shows a left hand end view of the bag of FIG. 6a;

FIG. 6d shows a right handed view of the bag of FIG. 6a;

FIG. 7a shows a perspective view of the bag of FIG. 1 in an open condition with a liner thereof in an inverted position to facilitate washing thereof.

FIG. 10d shows a left hand end view of the insulated bag of FIG. 10a;

FIG. 10e shows a right hand end view of the insulated bag of FIG. 10a;

FIG. 10f shows a top view of the insulated bag of FIG. 10a;

FIG. 10g shows a bottom view of the insulated bag of FIG. 10a;

FIG. 11d shows a left hand end view of the insulated bag of FIG. 11a;

FIG. 11e shows a right hand end view of the insulated bag of FIG. 11a;

FIG. 11f shows a top view of the insulated bag of FIG. 11a;

FIG. 11g shows a bottom view of the insulated bag of FIG. 11a.

DETAILED DESCRIPTION OF AN EMBODIMENT OF THE PRESENT INVENTION

Figure 1:
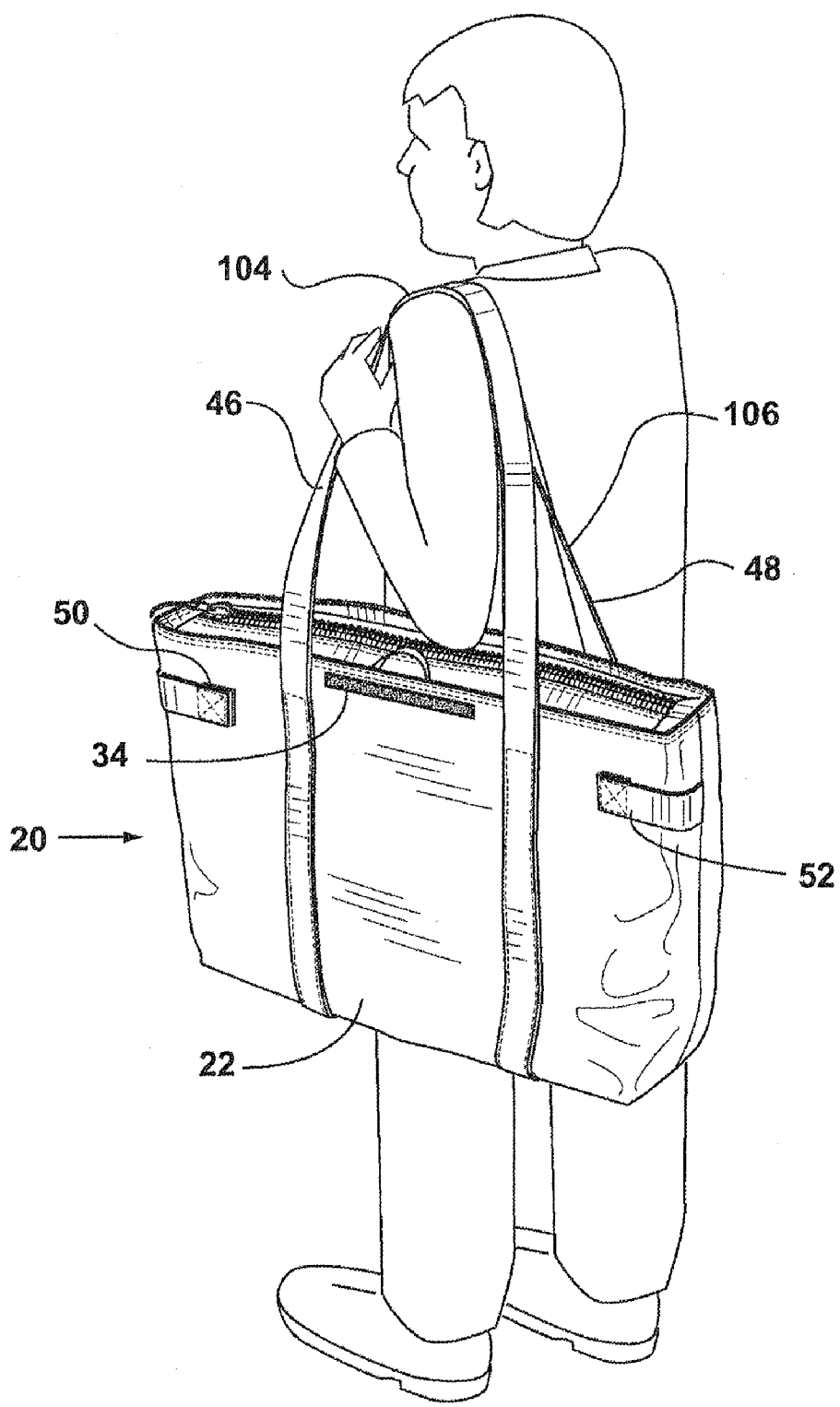
FIG. 1 shows a perspective view of an example of a foldable insulated bag of an embodiment of the present invention as carried by a user.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

For the purposes of this description, the largest panels of the bags herein described are arbitrarily designated as the front and rear sides, faces, or portions of the bag. Similarly, the closure member, or opening of the bag is arbitrarily designated as being at the top, and the base panel is designated as being at the bottom. It should also be understood that, within the normal range of temperatures to which human food and human touch is accustomed, although the term cooler, or cooler container, or cooler bag, may be used, such insulated structures may generally also be used to keep food, beverages, or other objects either warm or hot as well as cool, cold, or frozen.

As seen in the Figures, an example of a portable, collapsible soft sided, insulated wall structure is identified as a foldable cooler tote bag 20. This structure can be referred to as an insulated bag, an insulated container, a cooler, or such like. The basic structure of bag 20 includes a first side panel, or wall, or sidewall, arbitrarily designated front panel 22, a second side panel, or wall, or sidewall, designated arbitrarily as rear panel 24, and a third panel or wall identified as a bottom, or base panel 26. As described more fully below, these panels are joined together to form a pouch, or bag, having an enclosed internal space 25 surrounded by insulated walls. The enclosed volume of internal space 25 varies with the condition of the bag. That is, while the bag is in a folded (that is, collapsed) condition or position, or is lying flat, the internal volume is negligibly small, if not zero. However, when bag 20 is in an unfolded condition, or expanded position, it may tend to take on a shape to accommodate objects placed within the internal space, and it may assume a suitably capacious internal volume.

When bag 20 is in use, access to the internal volume, namely internal space 25 thereof, is governed by a closure member 28. In the illustrated example, closure member 28 may be a linear tracked closure device in the nature of a zipper assembly 30 mounted between the upper margins of the side wall panels, namely front and rear panels 22 and 24. Other kinds of closures could be used such as a velcro (t.m.) hook-and-eye fabric closure, a series of spaced apart snaps, a continuous mating plastic tongue and groove or other device. A relatively robust zipper assembly is preferred, as it may tend to provide a simple, quick, and relatively strong closure.

While bag 20 can be made water-tight by other means, it is preferred to provide a liner 32 that can be either sewn in place, or may be removable, or it may be wholly or partially invertible. A liner that is at least partially invertible, or removable, is preferred, since this may facilitate washing.

Figure 6A:
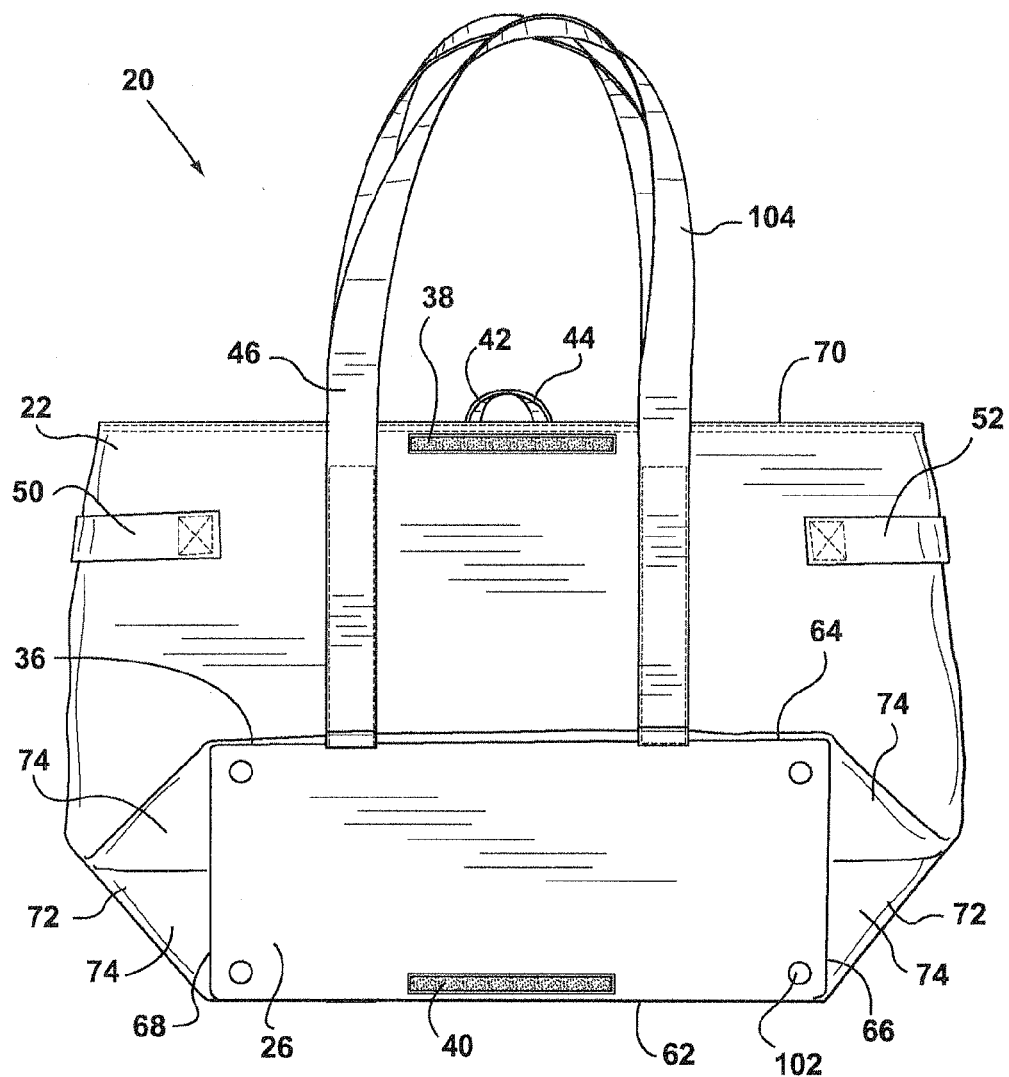
FIG. 6a shows a front view of the bag of FIG. 1 in a partially folded condition.
Figure 6B:
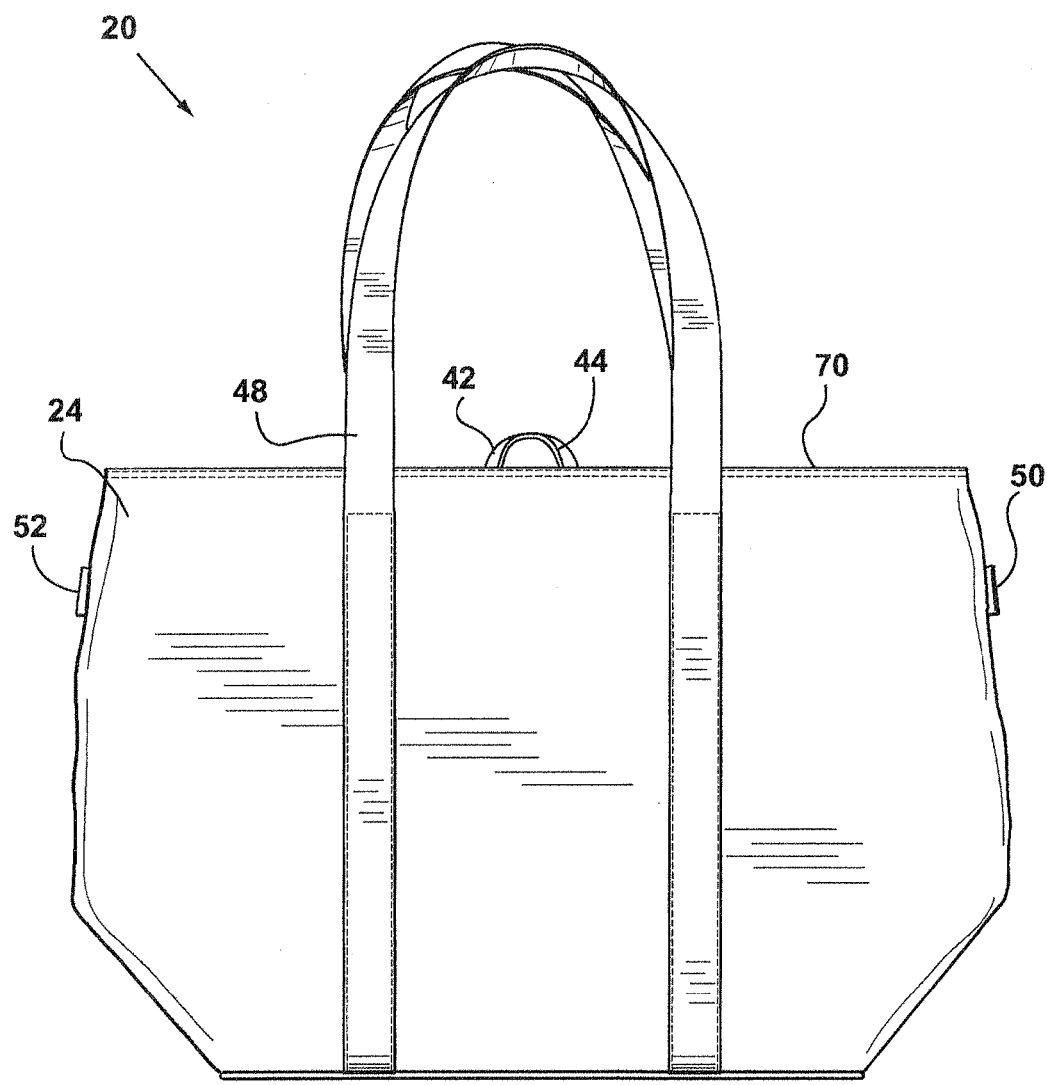

When the bag is not in use, it may tend to be readily foldable. First, the bag is collapsed by lying it flat and folding front sidewall panel 22 near its bottom margin such that base panel 26 lays in a more or less flat orientation relative to the rear sidewall panel, 24, as seen in FIGS. 6a and 6b. In this, collapsed, generally flattened, position, the upward edge 36 of base panel 26 (namely the edge that is folded toward front sidewall panel 22 and hence toward what would normally be the upper parts of bag 20 generally) acts as a former, or form, for bending the body of bag 20 to define a first fold by rotating the folded part of the bag in the direction of arrow 'A' (counter-clockwise in the Figures, but arbitrary since it would be clockwise if viewed from the other direction, and bag 20 can be made with either a left handed or right handed fold). This permits one portion of bag 20 to fold over on another portion, in the manner of folding a page over on itself.

Figure 3A:
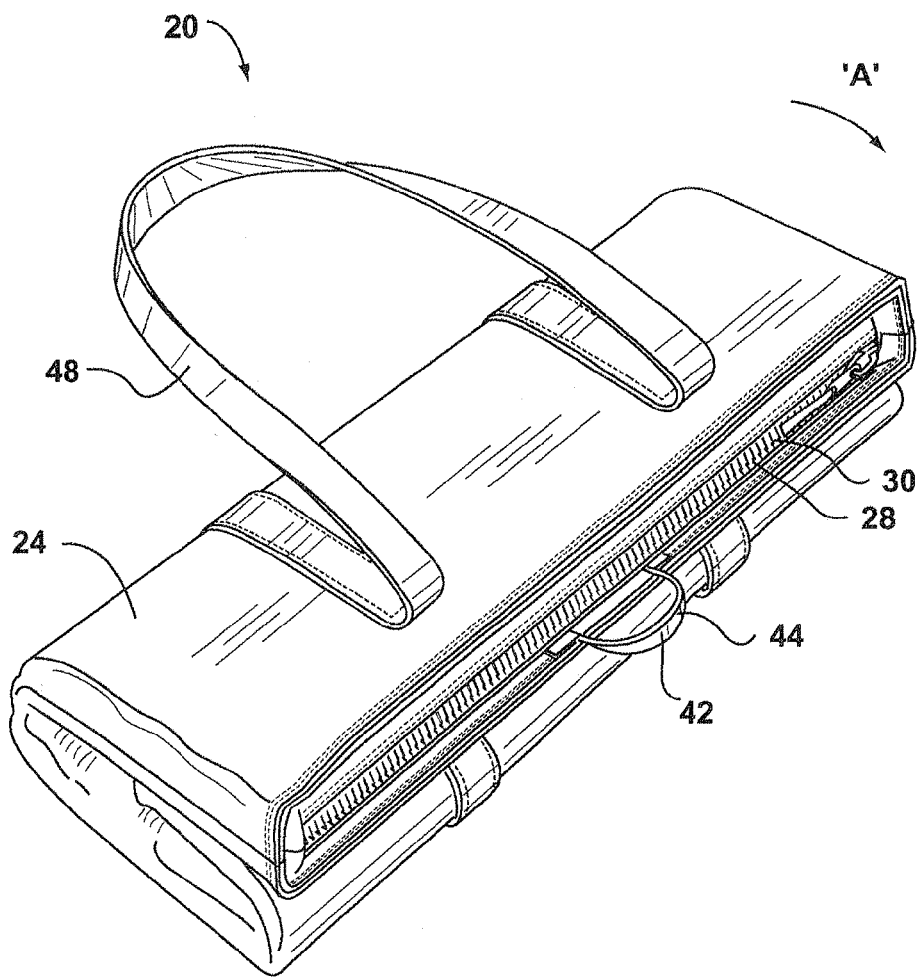
FIG. 3a shows a perspective view of the bag of FIG. 1 as folded.
Figure 3C:
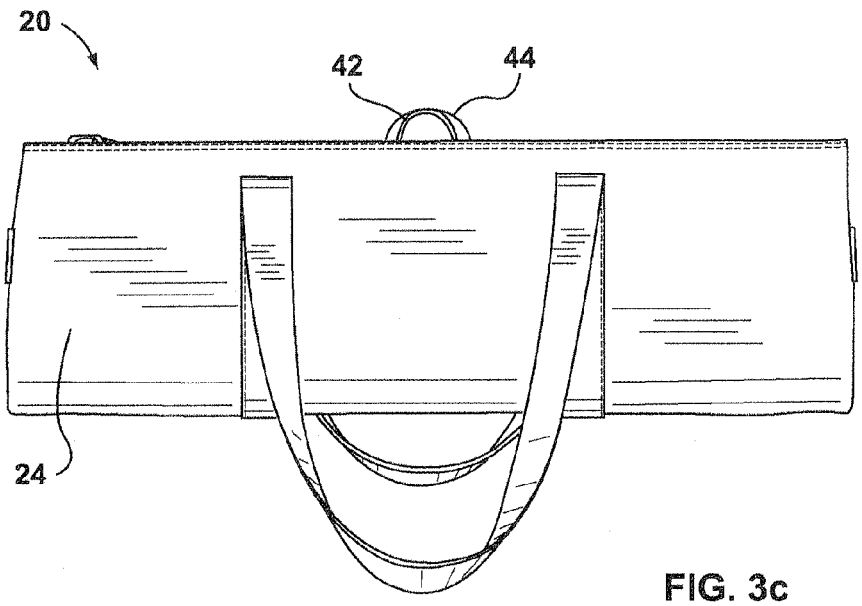
FIG. 3c shows a rear view of the bag of FIG. 3a in the fully folded condition.
Figure 3B:
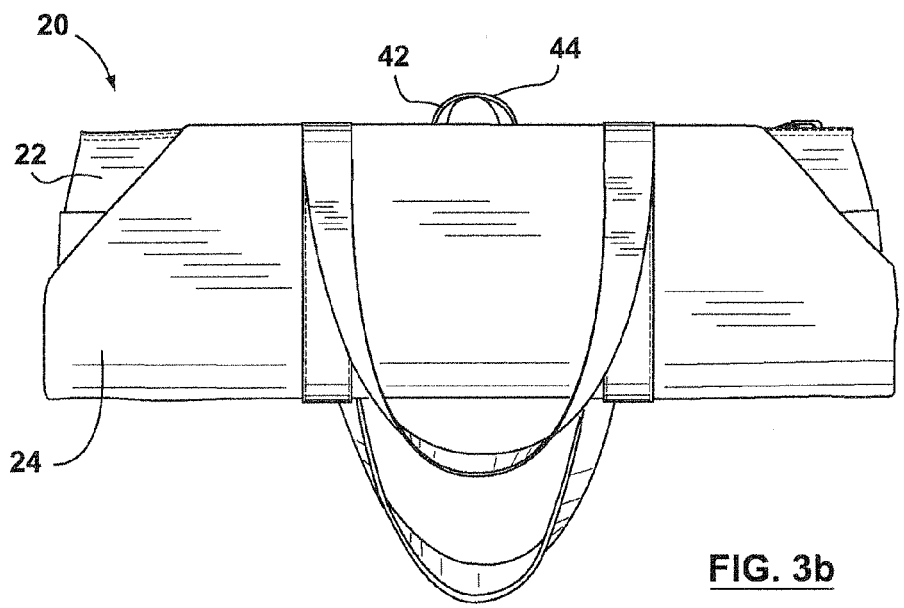
FIG. 3b shows a front view of the bag of FIG. 3a in a fully folded condition.
Figure 3G:
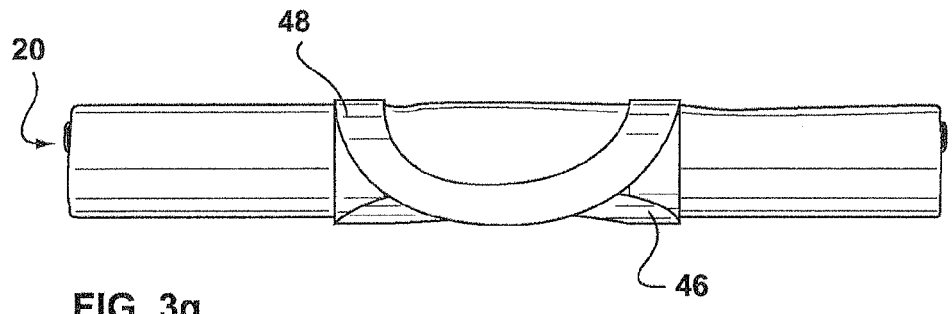
FIG. 3g shows a bottom view of the bag of FIG. 3a in the fully folded condition.
Figure 3F:
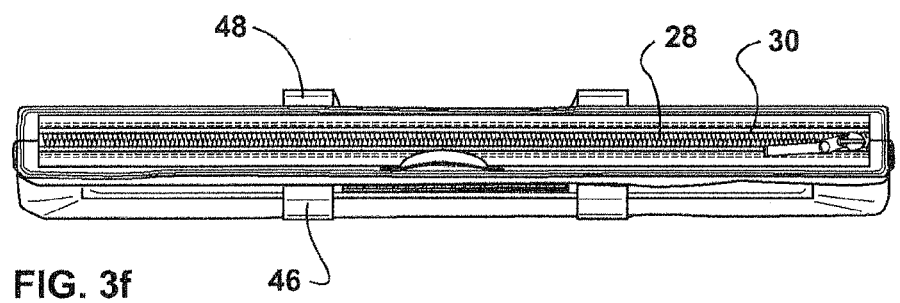
FIG. 3f shows a top view of the bag of FIG. 3a in the fully folded condition.
Figure 3E:
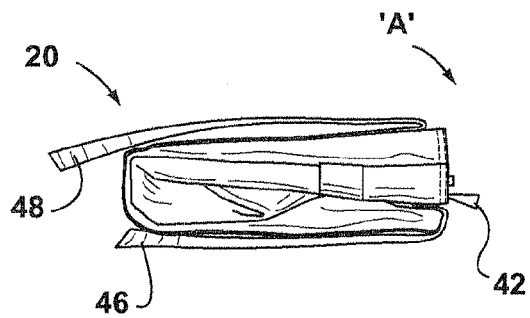
FIG. 3e shows a right hand end view of the bag of FIG. 3a in the fully folded condition.
Figure 3D:
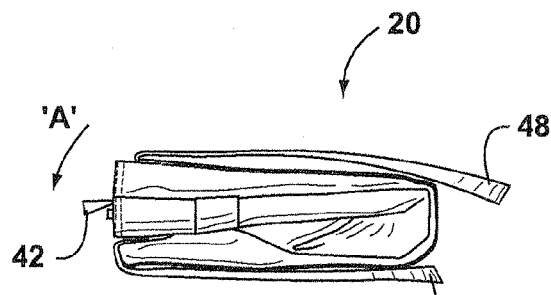
FIG. 3d shows a left hand end view of the bag of FIG. 3a in the fully folded condition.
Figure 3H:
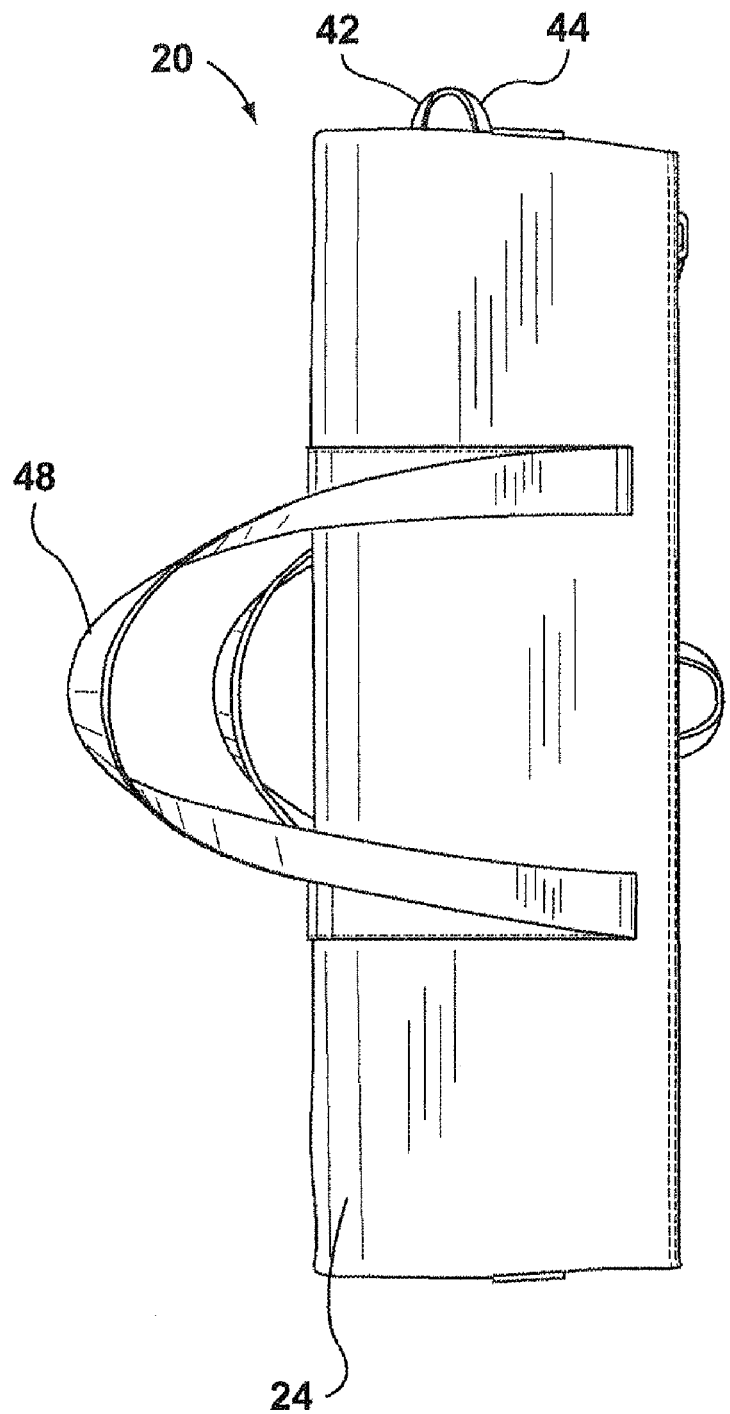
FIG. 3h shows the bag of FIG. 3c with an alternate hang loop orientation.
Figure 4A:
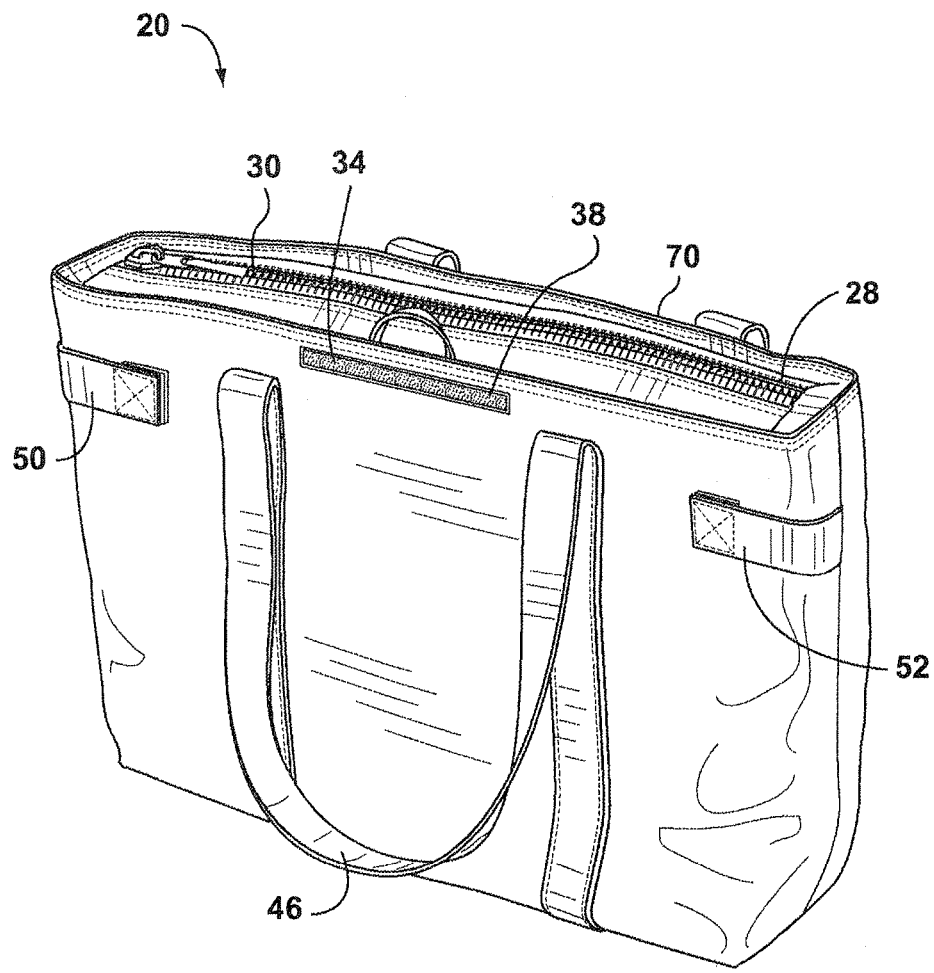
FIG. 4a shows a perspective view of the unfolded bag of FIG. 1.
Figure 4C:
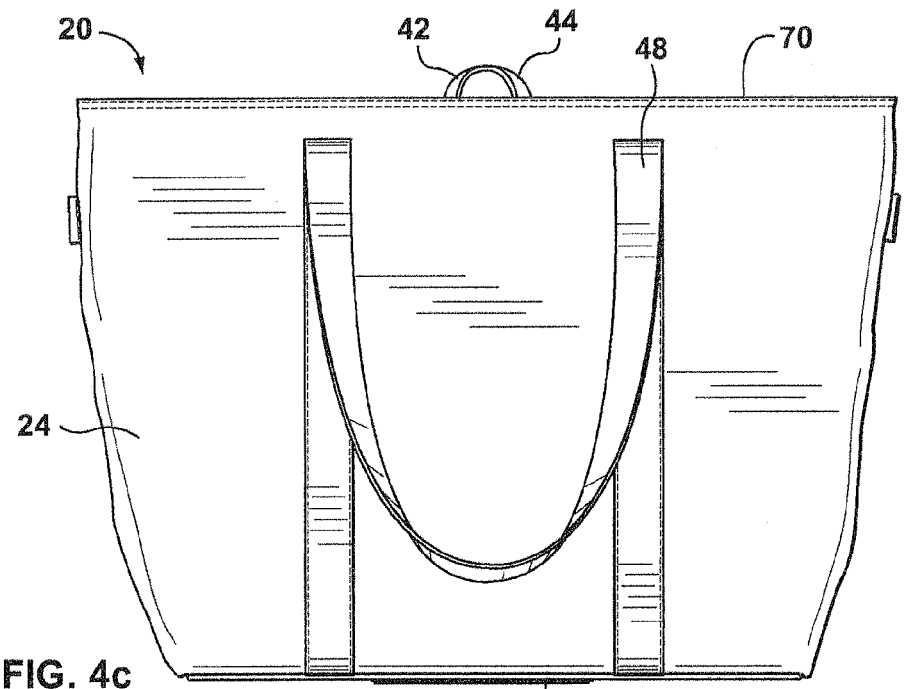
FIG. 4c shows a rear view of the bag of FIG. 4a in the fully unfolded condition.
Figure 4B:
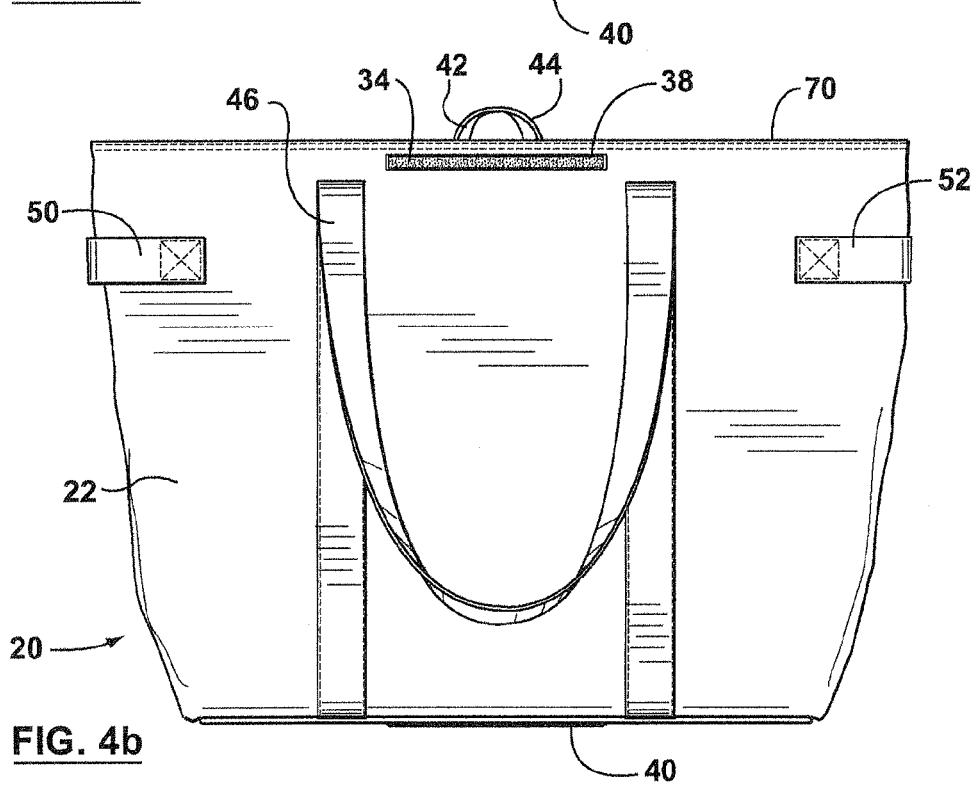
FIG. 4b shows a front view of the bag of FIG. 4a in a fully unfolded condition.
Figure 4E:
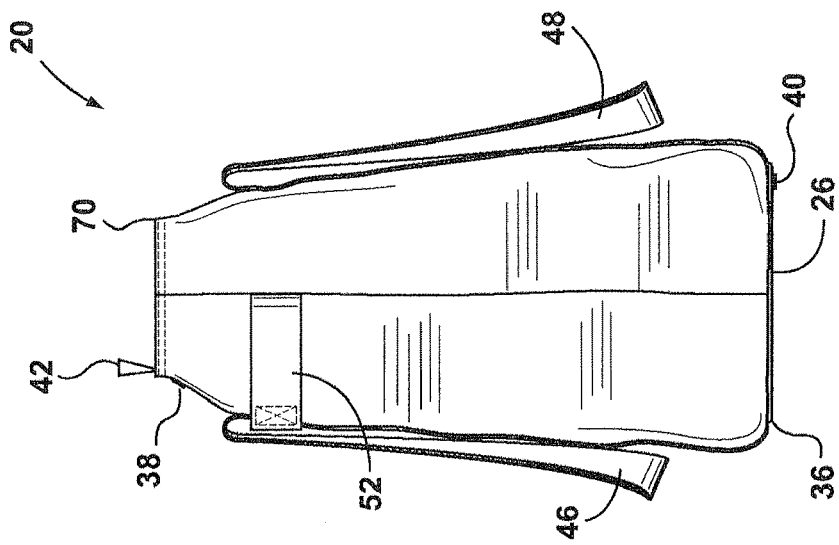
FIG. 4e shows a right hand end view of the bag of FIG. 4a in the fully unfolded condition.
Figure 4D:
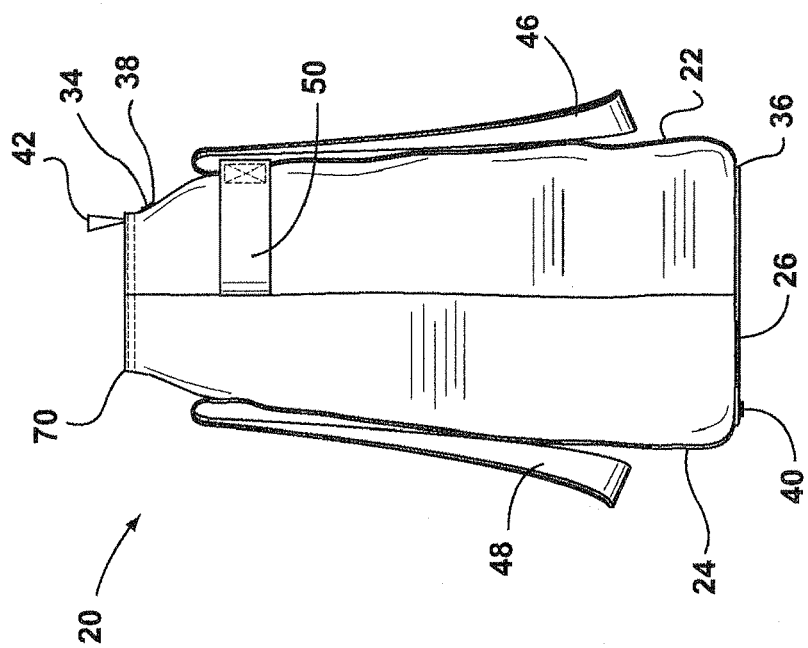
FIG. 4d shows a left hand end view of the bag of FIG. 4a in the fully unfolded condition.
Figure 4F:
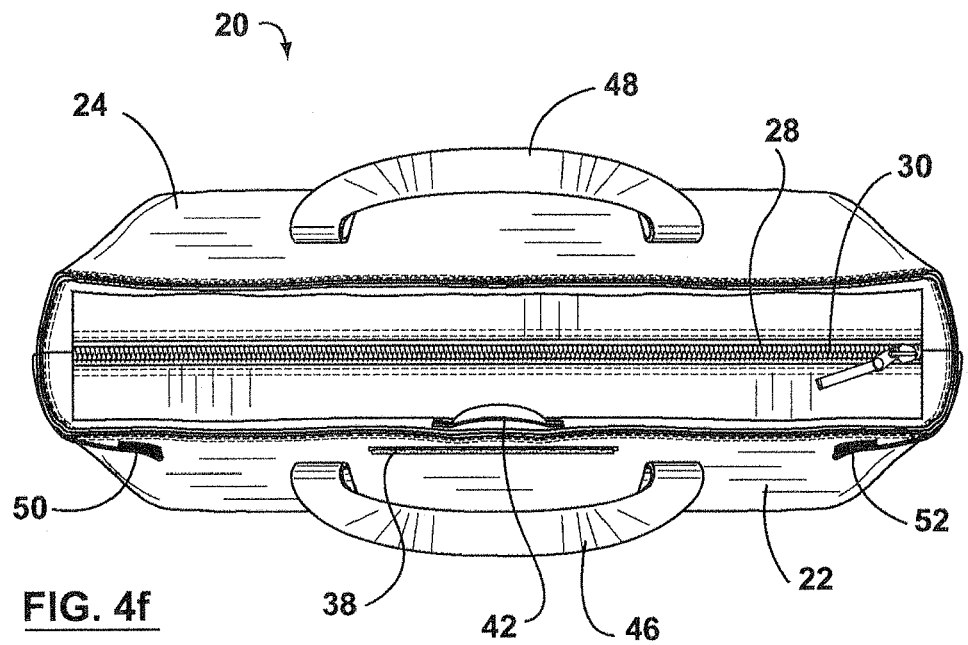
FIG. 4f shows a top view of the bag of FIG. 4a in the fully unfolded condition.
Figure 4G:
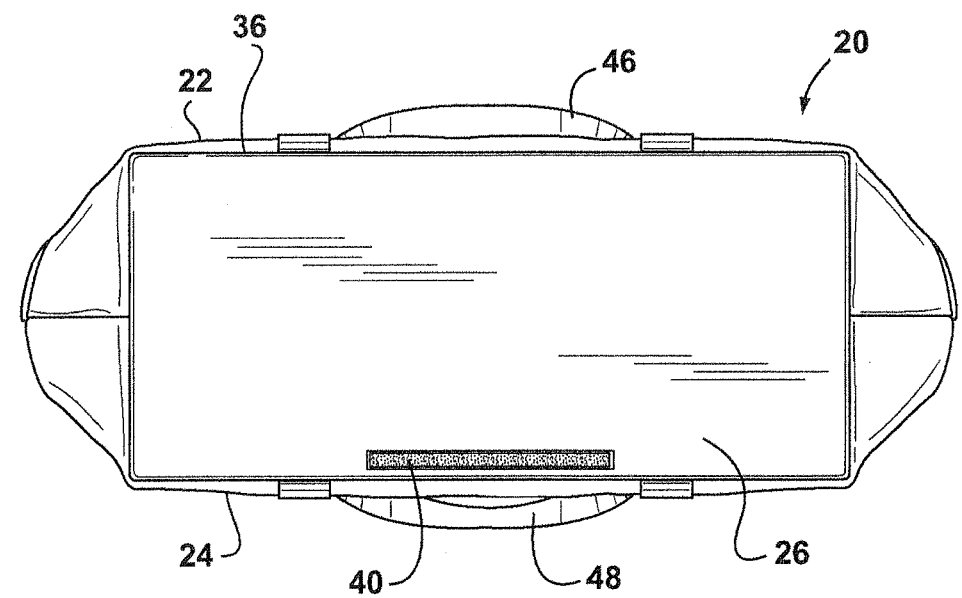
FIG. 4g shows a bottom view of the bag of FIG. 4a in the fully unfolded condition.

When page-folded in the direction of arrow 'A', bag 20 will arrive at the folded position shown in FIGS. 3a-3g, in which position it is held by a securement member, or retainer, identified as 34, which may take the form of a pair of mating securement strips such as hook-and-eye velcro (t.m.) strips 38 and 40 mounted, respectively, to the upper body portion of front side panel 22 adjacent the upper margin thereof, and to the distal margin region of base panel 26 that is distant from the forming edge of base panel 26, such that when base panel 26 is overfolded in the direction of arrow 'A' strips 38 and 40 are brought into mating contact in a single relatively uncomplicated, and possibly quite swift motion. The result is a soft sided insulated container that has been collapsed, and then panel-folded over on itself (i.e., not scrunched into a tight roll) to a flat folded position, or flat folded condition, such as may be suitable, for example, for stacking, transport, display or storage. Display and storage is facilitated by a suspension member 42, in the nature of a hang loop 44, mounted generally centrally along the upper margin of front panel 22. To the extent that loop 44 is mounted higher than the center of gravity of bag 20 more generally, bag 20 will tend to hang with the upper margin of front panel 22 in a generally horizontal orientation. An alternate hang loop location is shown in FIG. 3h, in which hang loop 44 is located at an end edge such that, when displayed for sale, bag 20 may tend to hang in a vertical, or substantially vertical orientation, namely with the long dimension (as folded) running up and down, i.e., more or less vertically.

Figure 2:
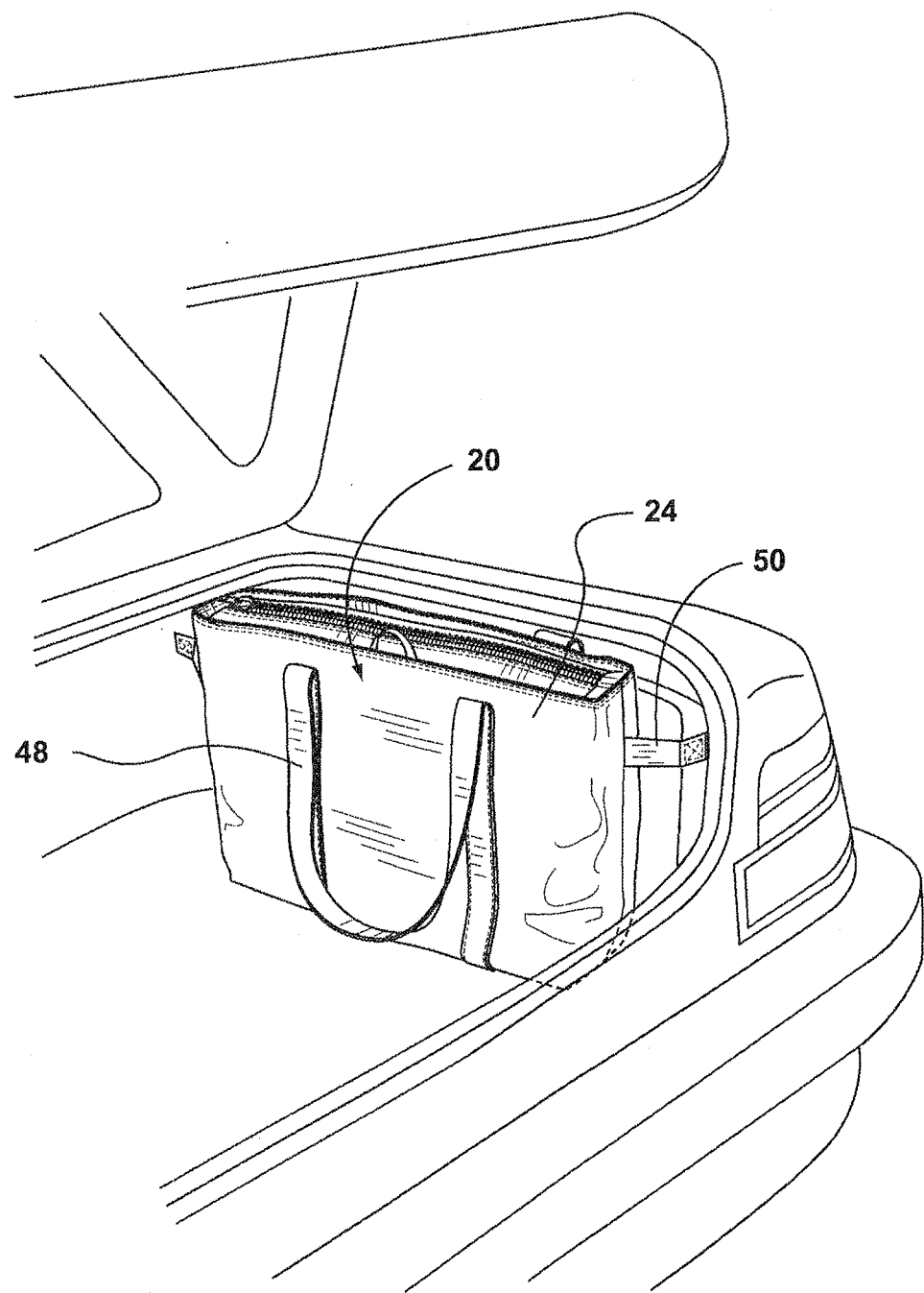
FIG. 2 shows a perspective view of the bag of FIG. 1 as installed in the trunk of an automobile.

Unfolding may tend to be a similarly uncomplicated and convenient procedure: the retainers are released, the bag is unfolded and it is ready to accommodate objects that need to stay cool or warm. When unfolded, lifting members in the nature of handles, or straps 46, 48 that extend from the upper regions of the sidewall panels, namely panels 22 and 24, can be grasped to lift bag 20, and may, as illustrated in FIG. 1, be found suitable for carrying over a person's shoulder. Alternatively, or additionally, as illustrated in FIG. 2, bag 20 is provided with auxiliary securement devices 50, 52, such as may be in the nature of velcro straps, to engage the felt-like or fibrous mat interior of an automobile, especially an automobile trunk, or boot, or cargo carrying area of a station wagon, van, or sports or utility vehicle. Securement devices 50, 52 may tend to be used to discourage a loaded bag 20 from tipping over when travelling, such as when bringing cold items home from the grocery store, or such as when transporting refreshments to a campsite, picnic site, playing field, or arena.

Figure 8:
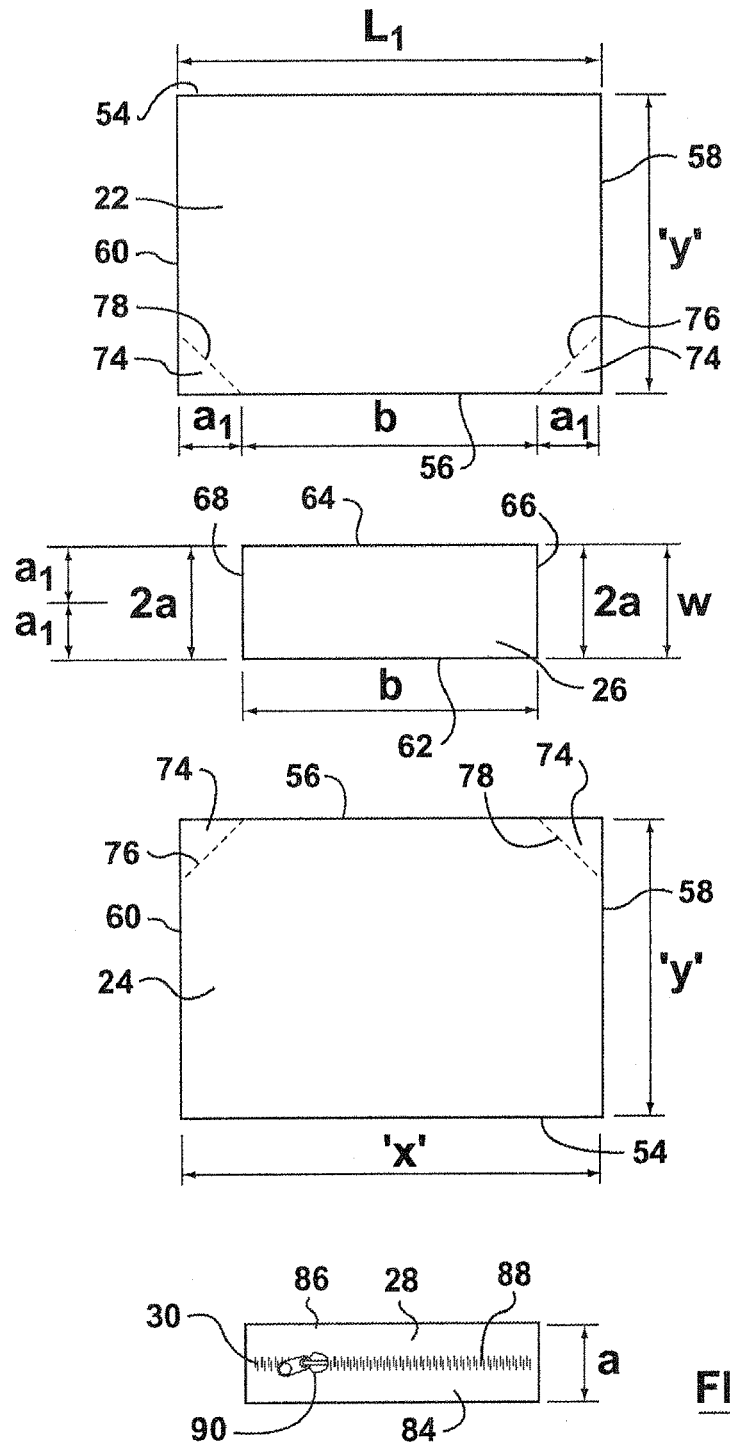
FIG. 8 shows a developed view of panels of the bag of FIG. 1 prior to assembly.

Considering the construction of bag 20 in greater detail, reference is made to the developed views of panels 22, 24 and 26 provided in FIG. 8. In the developed views shown in the example of FIG. 8, the side panels, namely insulated front and rear panels 22 and 24, are of the same size and shape, and are generally rectangular. They have a breadth dimension indicated as 'X' measured along either the upper or lower marginal edges 54, 56, and a height dimension indicated as 'Y', measured perpendicular to dimension 'X', along the side edges 58, 60. By inspection, $L_1 = 'X' = b_1 + 2a_1$.

Insulated base panel 26 is also generally rectangular, having a long dimension measured along long edges 62, 64, and indicated generally as 'b', and a short dimension measured along the short, end edges 66, 68, indicated generally as 'w'. In this embodiment, the half width of the panel is identified as '$a_1$', and is equal to half of 'w'. The ratio of the half width 'a' to the length 'b' may tend to be in the range of less than about 1:2 and greater than about 1:16, or within the narrower range of less than about 2:5 and greater than about 1:8, or within the preferable range of less than about 1:3 and greater than about 1:6. In one particular example the ratio may be about 3¼: 11½, in another particular example the ratio may be about 3¼:15½, and in a third particular example the ratio may be about 3¼:17½.

The width of base panel 26 may also be related to the overall height of bag 20 when unfolded. That is, it is preferred that retainer strip 40 on the off-side of base panel 26 mate with retainer element 38 on front panel 22 of bag 20 at a region close to the upper edge 70 of bag 20 generally, to yield a neatly folded bag for efficient packing, shipping and display. To that end, with allowance for a bend radius, it is preferred that the height of bag 20 be within +/−20%, and more preferably within +/−10%, of an integer multiple of the width of base panel 26. It is also preferred that bag 20 be a double or triple folded bag. While bags with a greater number of folds are possible, the benefits of ease of manufacture, ease of folding, and ease of use may not necessarily tend to be as marked for a larger number of folds.

The upper edge, i.e., upper marginal edge 54, of each of the side panels 22 and 24 is longer than the long dimension 'b' of the bottom, or base panel 26, such that when the closure member is secured, bag 20 may tend to have an upwardly broadening profile when viewed from the side, and an upwardly narrowing profile when viewed from the end. In the embodiment of FIG. 8, the periphery of base panel 26 is equal to 2(2$a_1$+b). Each of the side wall panels, namely front and rear panels 22 and 24, has a lower, or bottom edge, 56 noted above. Each of these bottom edges 56 extends about one half of the periphery of base panel 26, having a central portion of length 'b' and two opposite end portions, each of length '$a_1$' or thereabout. In this instance, when bag 20 is collapsed, and bottom panel 26 is laid flat, a triangular end fold will be created, made up of the triangular folds 72 of the bottom corners of the side wall panels, those triangular portions being indicated as triangular regions 74 on FIG. 8, and being bounded by fold lines 76, 78.

When assembled, front and rear panels 22, 24 are sewn together along their upwardly extending edges 58, 60, the central portions of their bottom edges 56 are sewn to the long sides, or edges 62, 64 of base panel 26, and the end portions are sewn to the half-width portions of end edges 66, 68 of base panel 26. The closure member 28 has the form of zipper assembly 30 as noted above. Zipper assembly 30 has a first side region 84, a second side region 86, and a zipper 88. Side region 84 has an outboard, or distal edge seamed into front panel 22, and an inboard edge, or margin, to which one set of teeth of zipper 88 is mounted. Side region 86 has an outboard, or distal edge that is seamed into rear panel 24, and an inboard edge along which the other set of teeth of zipper 88 is mounted. In the usual manner, motion of zipper car 90 along the track defined by the zipper teeth controls the opening and closing of the zipper assembly, and hence controls access to the enclosed space 25 of bag 20 more generally, thereby permitting objects to be introduced into, or to be drawn out of, bag 20. Side regions 84 and 86 each have an upper, load bearing web member 92, 94 and an inner wall member 96, 98. In one embodiment of the invention, inner wall members 96, 98 may be reflective, or have a reflective inwardly facing (i.e., inward relative to the enclosed space 25 of bag 20 so that the reflective surface is oriented toward objects contained in bag 20) surface, and may preferably be made of "thermoflect" (t.m.) material. In another embodiment, inner wall members 96, 98 is a white, water proof nylon sheet. The seaming of the side region of zipper assembly 30 occurs at a height downset from the very edge of the side wall panels by a distance $\delta_1$ roughly equal to the half width $\delta_2$ of zipper assembly 30 such that when bag 20 is folded, side regions 84 and 86 may tend to fold next to those margins, rather than to protrude excessively.

The overall width of the web-like region, or panel formed by zipper assembly 30 is less than, if not significantly less than, the width of panel 26 such that the through thickness of bag 20 at the elevation of closure member 28 is small, if not very small, relative to the length of closure member 28, and relative to the length of upper marginal edge 54. It is preferred that the overall width of the closure member be less than 60% of the width of the base, and, in a particular example, is about half the width. As such, the ratio of through thickness to bag length may be about $a_2/(2a_2+b)$. This value may typically lie in the range of 1:5 to 1:8 and more narrowly in the range of 1:6 to 1:7½. The closure member is mounted between the upper margins of the side wall panels, namely panels 22 and 24, and, when open, permits at least central portions of those margins to be moved closer together or further apart as may be desired to give access to the enclosed chamber.

Figure 5:
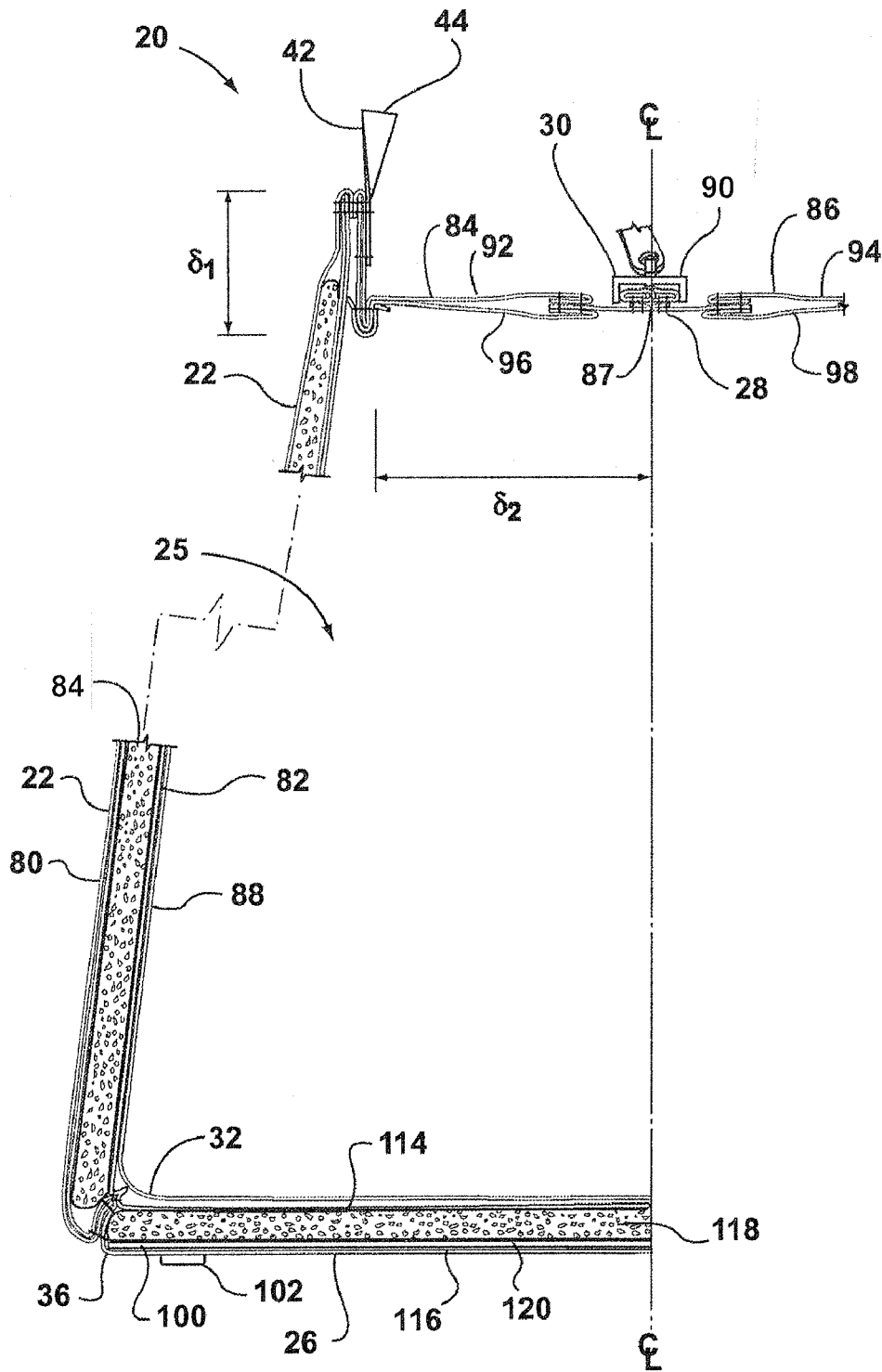
FIG. 5 shows a cross sectional view of the bag of FIG. 1, taken abeam of the handles (with the handles not shown)

The sidewall construction is as shown in FIG. 5. Each of sidewall panels 22, 24 has a relatively wear resistant outer membrane or sheet, or web 80, that may be made of a sheet or woven webbing fabric, such as woven nylon, canvas, or other suitable cloth. Each of sidewall panels 22, 24 also has an inner sidewall membrane, or sheet, or web 82, that may function as a water proof lining, and may be made of a sheet of extruded plastic of the types of polymers that include vinyl (t.m.) or nylon (t.m.), or sheets of monolithic extruded vinyl (t.m.) or nylon (t.m.) sewn together.

An insulating layer 84 is trapped between the inner and outer webs 82 and 80. Insulating layer 84 may preferably be a closed cell polyurethane foam, but could be an open cell insulating foam, or other type of insulating layer, or it may include more than one insulating layer.

As above, in one embodiment the inner sidewall web member may either be made of a reflective material, such as thermoflect (t.m.) sheeting, or may have a reflective surface oriented to face toward objects contained within bag 20. Alternatively, inner web 82 member may be made of a water proof extruded nylon or vinyl sheet, or seamed sheets, to discourage leakage of liquids from bag 20.

Figure 7B:
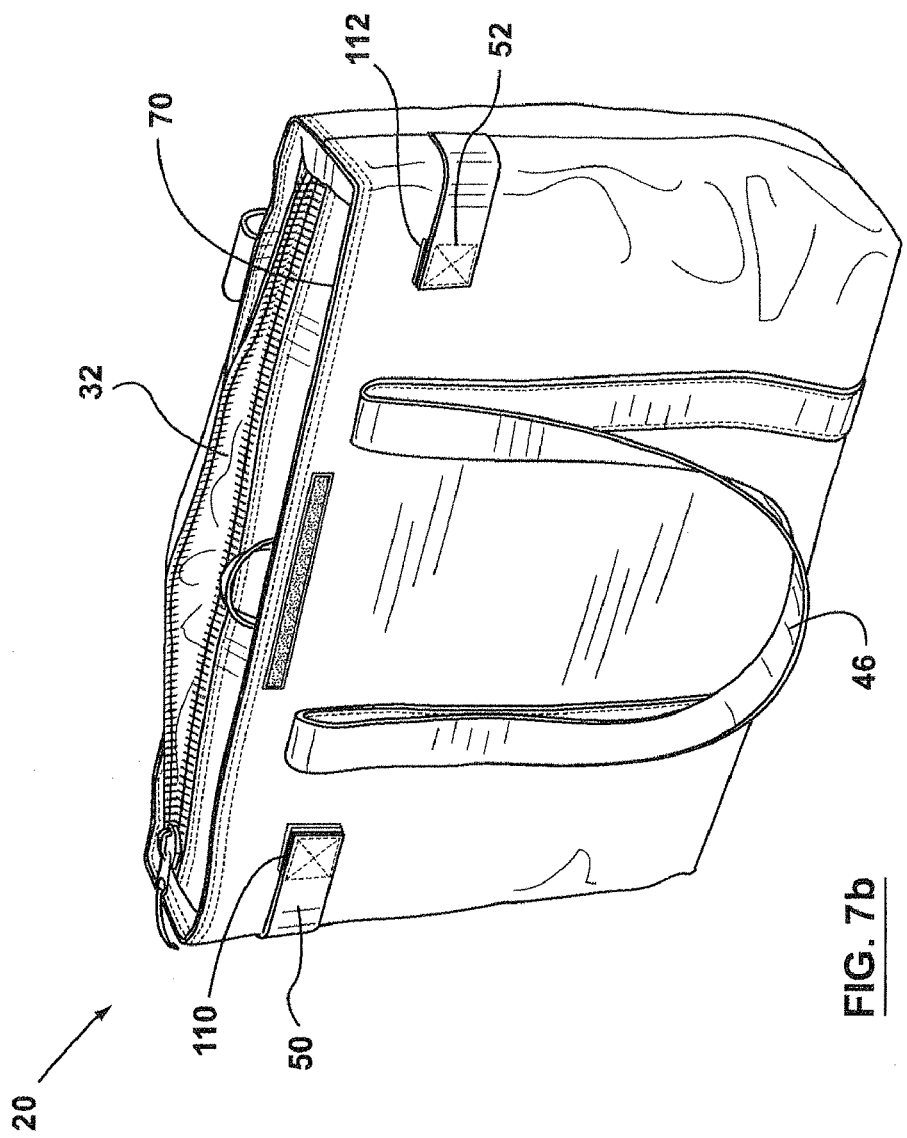
FIG. 7b shows a perspective view of the bag of FIG. 1 in an open condition.

Optionally, water-proof liner 32 may be included, in addition to the internal sidewall web sheet, namely, web 82. Where the inner sidewall surface is reflective, the liner may preferably be translucent, or clear, to permit the reflective surface of the inner wall to be seen. Although the liner can be rigidly sewn in place to prevent the liner from being inverted, it is preferable for the liner to be either removable, or to be sewn in at its upper peripheral edges, thus permitting at least partial inversion of the liner as shown in FIG. 7a, and hence to facilitate washing. The optional liner 32 may be made from a single polymer sheet, have a first side region 88 and a second side region 90. The side regions are heat welded along their side margins to form a pouch, or pocket, commensurate with the general size and shape of the inside of bag 20, and have their upper margins seamed into the side-walls of bag 20 at the juncture with the side regions of zipper assembly 30. Bag 20 will then tend to be water-proof to a height corresponding to the height of closure member 28. It is advantageous, and desirable, for a soft sided insulated wall assembly for use as a cooler, such as bag 20, to be generally leak resistant, if not even more preferably, water-proof.

The cross-sectional structure of base panel 26 is generally similar to the cross-sectional structure of the sidewall panels, having an inner wall skin, or panel or web 114 that is of consistent construction to the inner wall sheet or web 82, and an outer wall skin, or web 116 that is of consistent construction to outer web 80. It may be noted that the outer web 80 may not be the same colour as outer web 116, and may not be of the same weave or fabric. It may have a heavier, more wear resistant fabric, or coarser, more wear resistant weave, since base panel 26 may tend to be placed in contact with the ground, or other underlying surface whether a paved roadway, concrete, rocks, earth, flooring, or some other support surface against which it may be expected to be slid, or to rub, in the course of use.

Base panel 26 may also have an insulated layer, 118, captured between webs 114 and 116, the insulated layer being made of an insulated foam, or other suitable heat transfer resistive medium as described above. In addition, base panel 26 has a stiffened form member 120, that may be in the nature of a rectangular, hard plastic sheet 100 of modest thickness located between insulating layer 118 and outer web 116. Sheet 100, in plan view, has dimensions that are the same as, or roughly the same as, dimensions 'b' and 'w'. Form member 120 serves two functions, the first being to provide a stiffened base upon which bag 20 can tend preferentially to stand, and which may tend to aid in discouraging bag 20 from tipping over as easily as it might otherwise do. The second is to provide a forming edge to base 26 by which to pre-determine the fold line, or lines, at which bag 20 will tend to want to bend when being folded up. This may tend to discourage the tight-rolling of bag 20, and to encourage repeatable panel folding to and from the convenient folded form shown in FIGS. 3a-3g.

Form member 120 need not be a continues monolithic panel. It could be an open frame, or a peripheral member sewn in place to provide a reinforced edge. In one embodiment, even without form member 120, the seaming at the edge of insulated base panel 26 may tend to yield a natural fold location at which bag 20 may tend to prefer to bend or fold. The inclusion of member 120 may tend to strengthen or to enhance this tendency. Modestly sized feet, stand offs, or pads, 102, may optionally be provided to the underside of panel 26. Further, form member 120 may, by itself, tend to have a greater flexural stiffness that the adjacent layer of insulated material, and when taken together the resultant bi-laminar, or possibly multi-layered assembly, has a combined flexural stiffness that may tend to be significantly stiffer than any other portion of bag 20.

Lifting members, or carrying members, in the nature of straps, or web bands 46, 48, are sewn up the outside faces of side wall panels 22 and 24, having their roots at the seamed junction between bottom panel 26 and the side wall panels 22, 24. Each of bands 46, 48 has a central portion 104, 106 that extends upwardly beyond the upper margins of the sidewall panels to provide a grasping, or carrying portion that can be held or place over a user's shoulder, as in FIG. 1.

Auxiliary securement straps 50, 52 have a root end sewn into the upper region of the seam between panels 22 and 24, at a height near the height of closure member 28 The distal ends of straps 50, 52 bear velcro patches 110, suitable for securing in to the trunk fabric of an automobile (or, alternatively, mating velcro patches can be mounted inside the automobile for this purpose). When not in use, the ends of straps 50, 52 mount to mating velcro patches 112 located on the outward face of front side panel 22. Straps 110 could as easily be oriented to face in the other direction, and to mate with patches sewn on rear panel 24.

ALTERNATE EMBODIMENTS

Figure 9A:
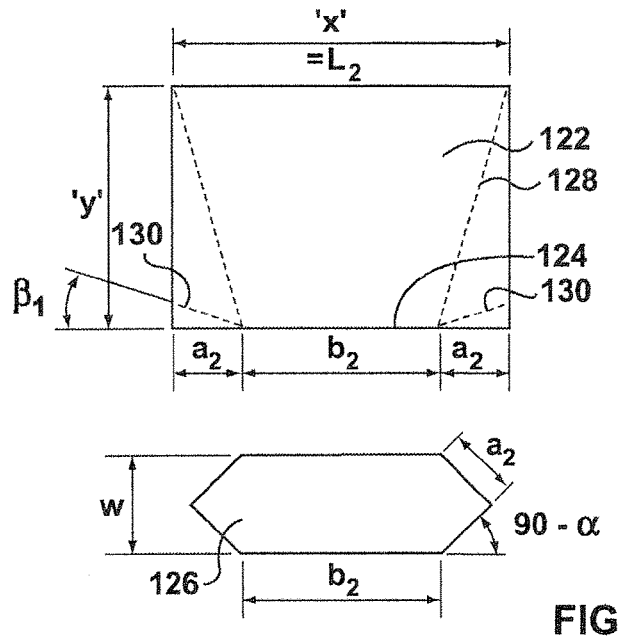
FIG. 9a shows a developed view of a bottom panel for an alternate embodiment of the foldable insulated bag of FIG. 1.

In the alternate embodiment of FIG. 9a, an alternate insulated base panel 126 has the same structural and thermal properties as base panel 26 in general, but differs in that rather than being rectangular in plan view, base panel 126 has a length, or long dimension, indicated as '$b_2$' and a width indicated as 'w'. These dimensions need not be the same as 'b' and 'w' indicated above, but may be. In this case the ends of panel 126 are not squared, but rather are mitred at an angle $\alpha$ relative to the perpendicular to the long edges. The length along each of the mitred edges is then given as '$a_2$'. In this case the half width of base panel 126 is not $a_2$, but rather $a_2 \cos\alpha$. The periphery of base 126 is $2(b_2 + 2a_2)$.

The adjoining side panels are again taken to be 'X' wide, and 'Y' high, and to be of the same general insulated construction as side wall panels 22 and 24, as shown, for example, in FIG. 5. The length of the lower margin 124 of each of the adjoining side panels 122 is then $(b_2 + 2a_2)$. Each panel will then have a "large fold" 128 and a "small fold" 130. Large fold 128 is a nominal indication of where there would be a fold in the side wall of the bag in the fully unfolded condition ready for filling with diverse objects, if a sharp crease were made. In actual use, the corner will not be creased, but rather will tend to take on a more rounded, or radiused form, and the bag will tend to conform to the shape and bulkiness of objects placed in it, so the actual corner of the bag may have a bulging appearance rather than a sharp corer. Small fold 130 indicates the actual location of a fold that is made when the bag is in a collapsed state and folded for storage.

The angle $\beta_1$ of small fold 130, when the bag is folded for storage, will then tend be roughly equal to the bisector of the angle between the extension of the horizontal fold line defined by the edge of base 126 and the mitred edge, namely ½ (90−$\alpha$).

Base panel 126 need not necessarily be a straight sided polygon, as are base panel 26, but could have somewhat rounded, oval or irregular ends. However, in such a case the end fold may tend to be puckered, and may tend not to lie as flat as might otherwise be considered desirable or preferable. However, a straight sided polygon is advantageous, and a square-cornered (i.e., rectangular) end is preferred since it may tend to facilitate manufacture and efficient use of materials and reduced waste cuts.

Bag 20 is a "double fold" bag. That is, base panel 26 is folded flat at a first fold (the offside edge of base panel 26), and then side panels 22 and 24 are bent about the second fold (the nearside edge of base 26). In alternate embodiments, a soft sided, collapsible and foldable insulate single-fold bag could be produced, or a triple-fold, or more, bag could be produced.

An example of a single fold bag 140 is shown in FIGS. 10a-10g, the views corresponding generally to the views of double fold bag 20 shown in FIGS. 3a-3g respectively. Except as otherwise indicated, bag 140 has the same general construction as bag 20, having insulated side wall panels 142, 144, and an insulated base panel 146, with a similar closure member 148 and optional liner similar to liner 32. Bag 140 differs from bag 20 in being a single fold bag, rather than a double fold bag, and has changes in dimension and aspect ratios accordingly. In place of the arrangement of retention member 40, a retention member 150 would might tend to be mounted near the lower margin of the front panel 142, and another, mating, retention member 152 would be mounted near the upper edge of the front panel, the two mating when the base panel is moved to a collapsed position in which it is laid over against side panel 142.

Figure 10A:
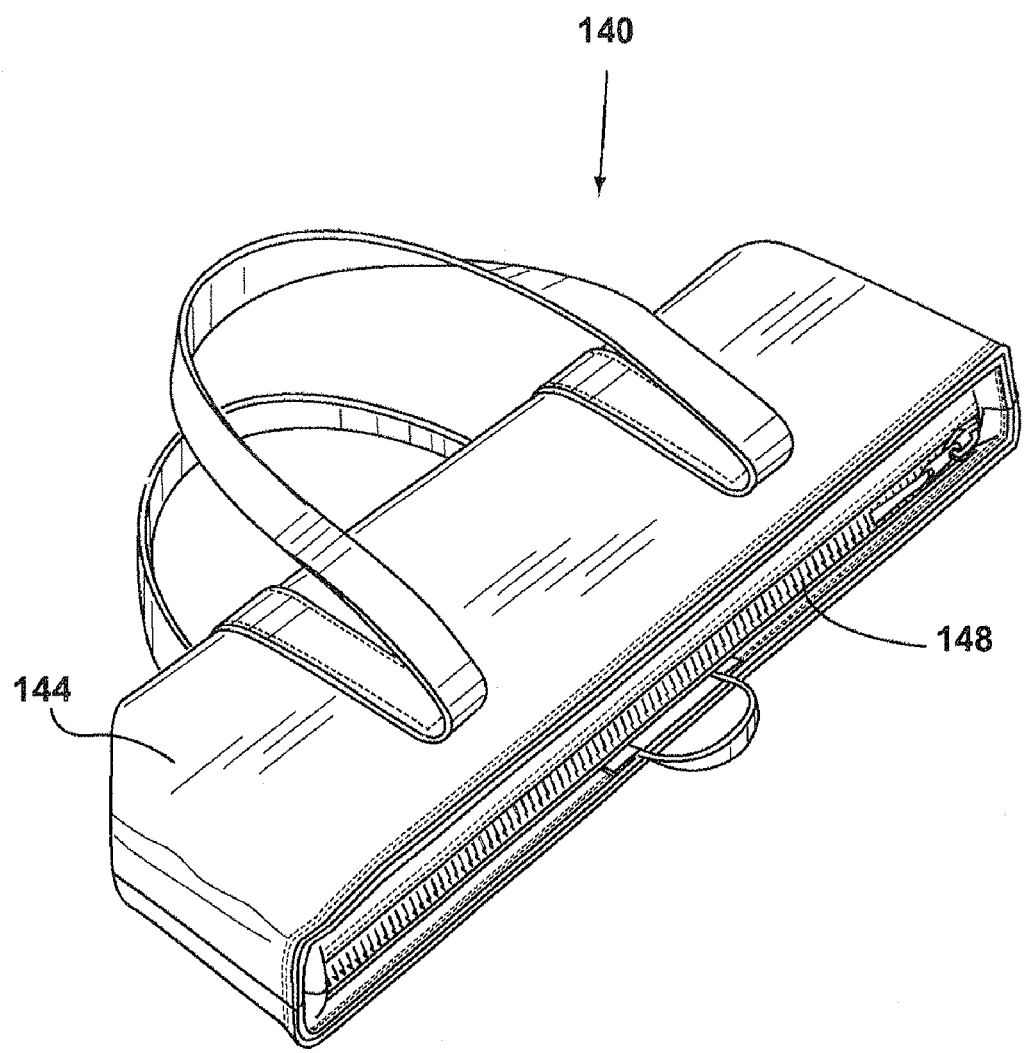
FIG. 10a shows an isometric view of a single fold, alternate insulated bag to that of FIG. 1.
Figure 10C:
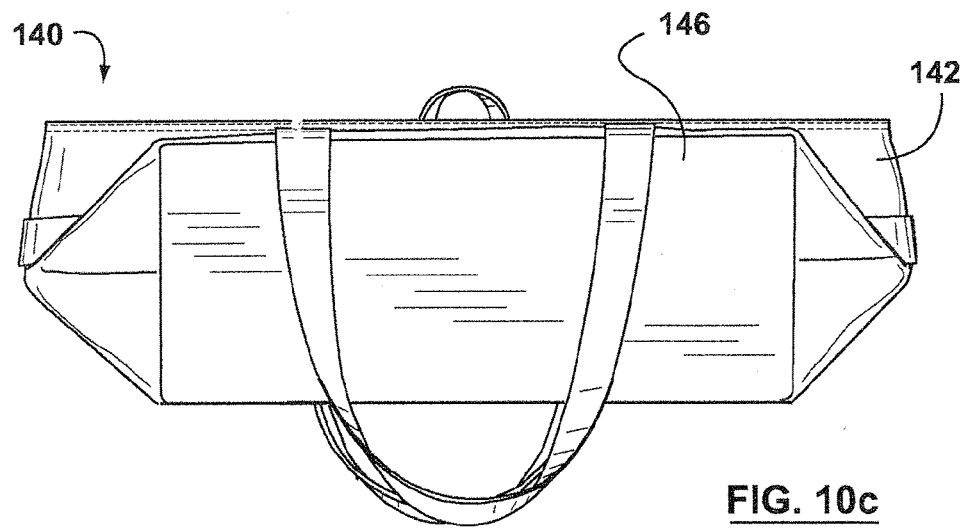
FIG. 10c shows a rear view of the insulated bag of FIG. 10a in a folded condition.
Figure 10B:
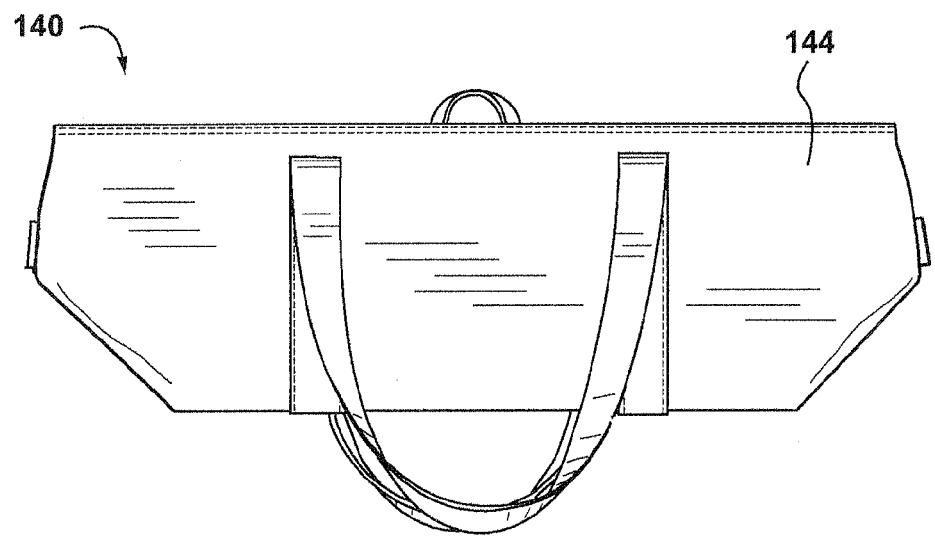
FIG. 10b shows a front view of the insulated bag of FIG. 10a in a folded condition.
Figure 10G:
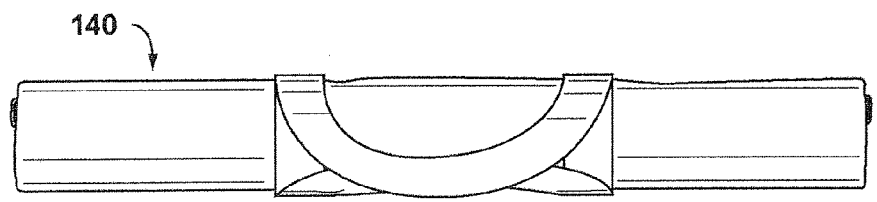
Figure 10F:
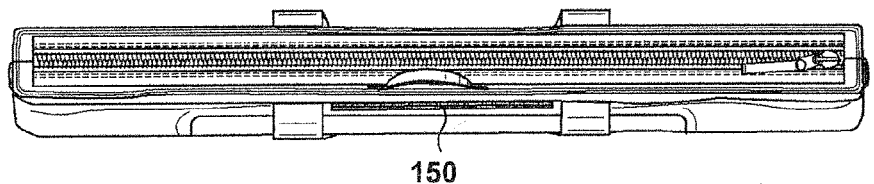
Figure 10E:
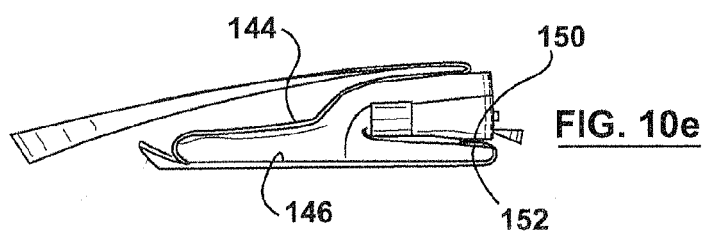
Figure 10D:
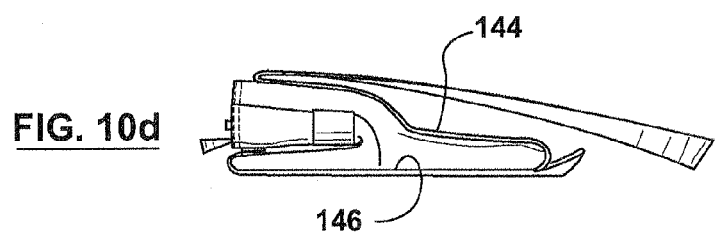
Figure 11A:
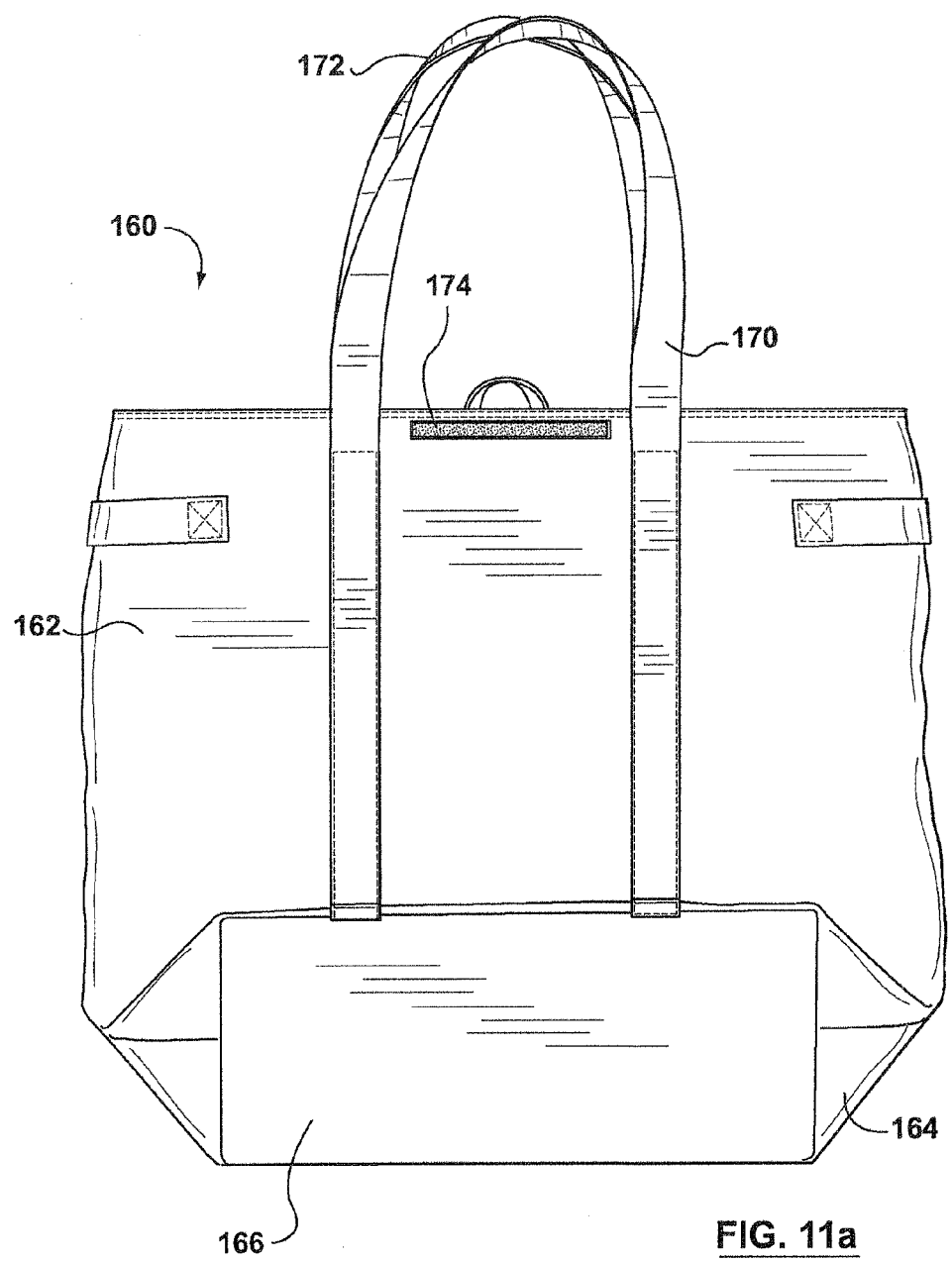
FIG. 11a shows a partially unfolded front view of a triple fold, alternate insulated bag to that of FIG. 1.
Figure 11C:
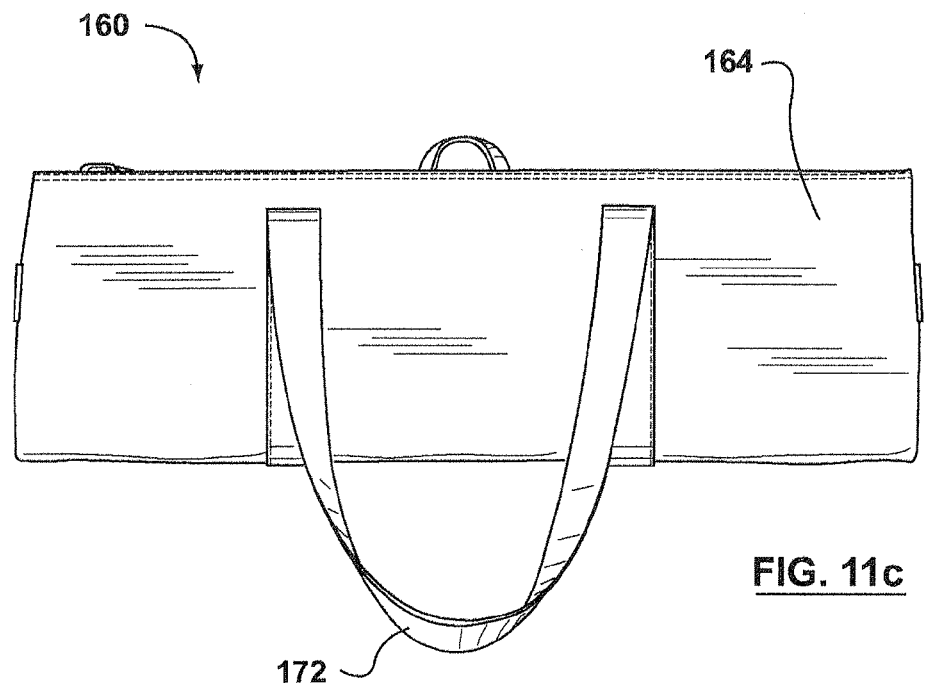
FIG. 11c shows a rear view of the insulated bag of FIG. 11a in a folded condition.
Figure 11B:
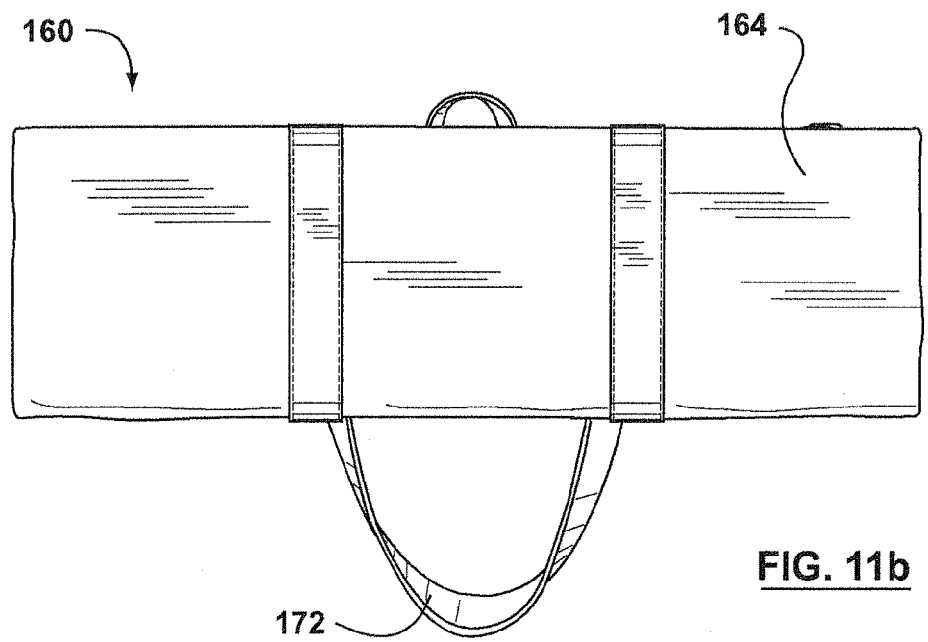
FIG. 11b shows a front view of the insulated bag of FIG. 11a in a folded condition.
Figure 11G:
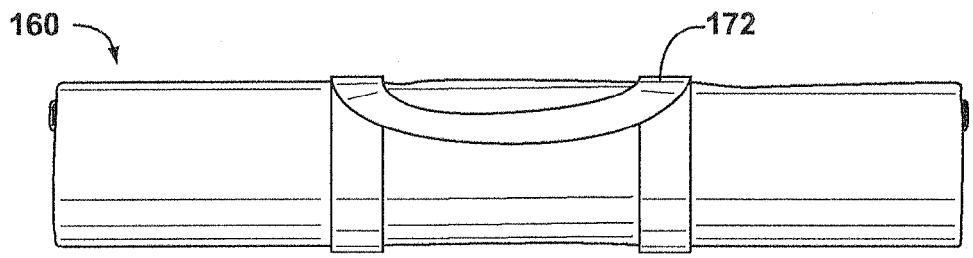
Figure 11F:
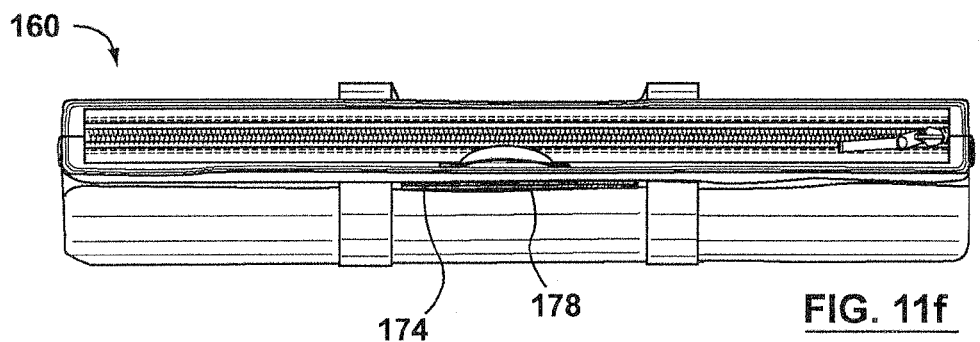
Figure 11E:
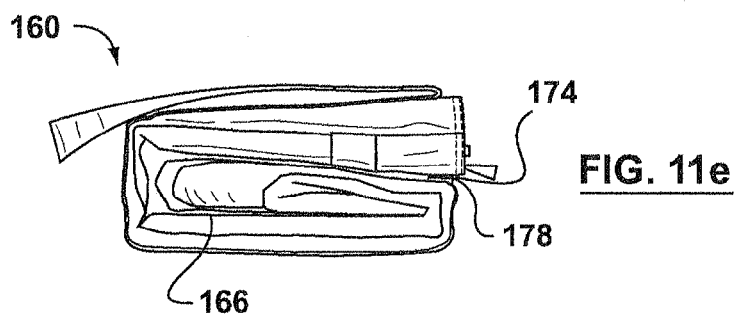
Figure 11D:
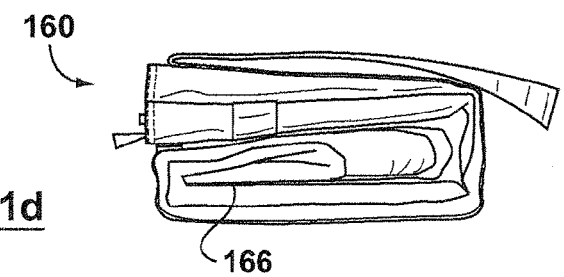

An example of a triple fold bag 160 is shown in FIGS. 11a-11g. FIG. 11a shows triple fold bag 160 in a collapsed, or flattened condition immediately prior to folding into the storage position (or, alternatively and equivalently, immediately after being unfolded, and before filling). Bag 160 is presented as being symbolic of not only a bag having three folds. In general, for a bag, such as bag 160, having three or more folds, the retention member 178 would be located on the front face 164 roughly the width of two folded panel regions below the upper edge of the front face with the second retention member being mounted near or at the upper edge, such that, when folded the two parts 178 and 174 would tend to mate. An example of a single fold bag is illustrated in FIG. 10a. An example of a triple fold bag is shown in FIG. 11a.

Figure 9B:
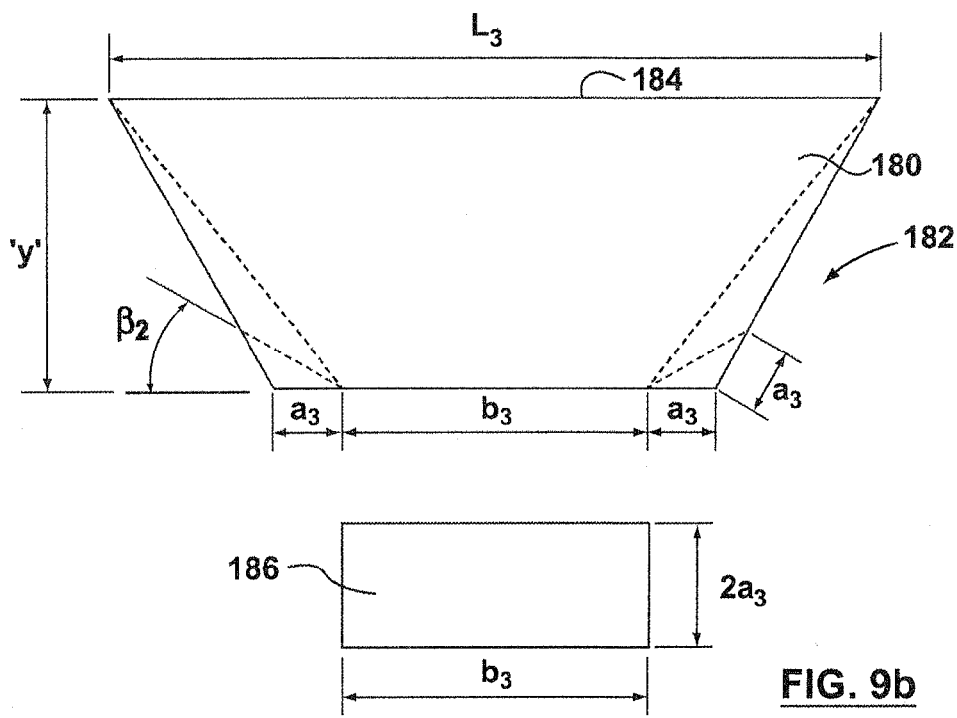
FIG. 9b shows a developed view of a side panel for an alternate embodiment of the foldable insulated bag of FIG. 1.

In the examples discussed so far, the upper edge of a bag having rectangular sidewall panels is $L_i=2(a_i+b_i)$, whether i is 1 or 2. As shown in FIG. 9b, the side panels of bag 20 need not be made from rectangular sheets, but could be made from sheets that are of a different shape, such as the trapezoidal side panel sheets 180. In this case, the resultant bag 182 would tend to have an upper edge 184 for which the length $L_2$ would tend to be greater than the sum of the $b+2a_i$, or, put generically, where $L_i$ is greater than half the total periphery of the base panel 186. This may tend to yield a more flared appearance when the bag is seen in an unfolded side view, and may tend to yield a larger access opening, such as may permit objects of greater relative size to be introduced into the insulated spaced.

Although the embodiments illustrated and described above are preferred, the principles of the present invention are not limited to these specific examples which are given by way of illustration. It is possible to make other embodiments that employ the principles of the invention and that fall within its spirit and scope of the invention. Since changes in and or additions to the above-described embodiments may be made without departing from the nature, spirit or scope of the invention, the invention is not to be limited to those details, but only by the appended claims.

I claim:

1. A foldable insulated bag comprising:
   an insulated wall structure, defining an insulated space therewithin;
   said wall structure having a closure member operable to govern access to said insulated space; and
   said wall structure including a forming panel;
   said wall structure, when empty, being movable to a first, flattened position;
   said wall structure being foldable about at least a portion of said forming panel to a folded storage position;
   said wall structure being securable in said folded storage position; and
   said forming panel including a stiffener member;
   and wherein:
   said foldable insulated bag has a base panel and a sidewall structure mounted about said base panel, said forming panel being said base panel;
   said foldable insulated bag has a retainer operable to secure said foldable insulated bag in said folded storage position;
   said sidewall structure includes first and second opposed sidewall panels, each said sidewall panel having a first edge adjoining said base panel and a second edge distant therefrom;
   said base panel has a first edge connected to said first sidewall panel, and a second edge connected to said second sidewall panel;
   said base panel has an outer face, and an inward face; in said flattened position said first edge of said base panel lies nearer than said second edge of said base panel to said second edge of said first sidewall panel;
   said outer face of said base panel has a first member of said retainer mounted thereto adjacent to said second edge thereof;
   said first sidewall panel has a second member of said retainer mounted adjacent to said second edge thereof; and
   said base panel is movable to bring said first portion of said retainer into mating engagement with said second portion of said retainer.

2. The foldable insulated bag of claim 1 wherein said first and second members of said retainer are mating hook-and-eye fabric strip portions.

* * * * *